United States Patent [19]
Nakajima et al.

[11] Patent Number: 5,940,769
[45] Date of Patent: *Aug. 17, 1999

[54] RADIO COMMUNICATION SYSTEM HAVING RE-SEND CONTROL METHOD

[75] Inventors: Nobuyasu Nakajima, Yokohama; Koji Ogura, Kawasaki; Mutsumu Serizawa, Tokyo; Yoshinari Kumaki, Kawasaki; Katsuya Nounin, Kawasaki; Eiji Kamagata, Kawasaki; Takashi Wakutsu, Yokohama; Tsutomu Sugawara, Yokosuka, all of Japan

[73] Assignee: Kabushiki Kaisha Toshiba, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/624,820

[22] Filed: Mar. 27, 1996

[30] Foreign Application Priority Data

Mar. 30, 1995 [JP] Japan ................................ 7-097897

[51] Int. Cl.$^6$ ..................................... H04B 7/00
[52] U.S. Cl. .......................... 455/509; 455/452; 455/517; 455/63.1; 370/216
[58] Field of Search ................................ 455/34.1, 54.1, 455/54.2, 56.1, 67.1, 39, 450, 452, 509, 517, 524, 423; 370/216, 310; 371/30, 32, 33, 35; 395/182.16

[56] References Cited

U.S. PATENT DOCUMENTS

| | | |
|---|---|---|
| 4,829,524 | 5/1989 | Yoshida . |
| 4,890,316 | 12/1989 | Walsh et al. . |
| 5,483,676 | 1/1996 | Mahany et al. .......................... 455/63.4 |
| 5,546,411 | 8/1996 | Leitch et al. ............................... 455/69 |
| 5,590,405 | 12/1996 | Daly et al. ............................... 455/452 |
| 5,600,707 | 2/1997 | Miller, II ................................. 455/434 |

FOREIGN PATENT DOCUMENTS 3-274834  12/1991  Japan .

OTHER PUBLICATIONS

"ATM Based Transport Architecture for Multiservices Wireless Personal Communication Networks," IEEE International Conference on Communications, May 1994, pp. 559–565; D. Raychaudhuri.

*Primary Examiner*—Edward F. Urban
*Attorney, Agent, or Firm*—Oblon, Spivak, McClelland, Maier & Neustadt, P.C.

[57] ABSTRACT

In a radio communication system, communication for sending data from a transmitting station to a receiving station and communication for transmitting re-send data from the transmitting station to the receiving station according to the re-send request transmitted from the receiving station to the transmitting station are done on different occasions of communication. Hence, in the applications not requiring real time service, this re-send control method does not spend the power and radio resources wastefully, and by effectively utilizing the system resources and lowering the power consumption, the battery of the terminal may be reduced in size, so that the portability of the terminal may be enhanced. Further, the radio communication system has a high speed down-link channel and a low speed down-link channel, data to be transmitted from a base station to a terminal is classified into primary data and secondary data, the primary data is transmitted by the high speed down-link channel, and the secondary data is transmitted by the low speed down-link channel.

2 Claims, 14 Drawing Sheets

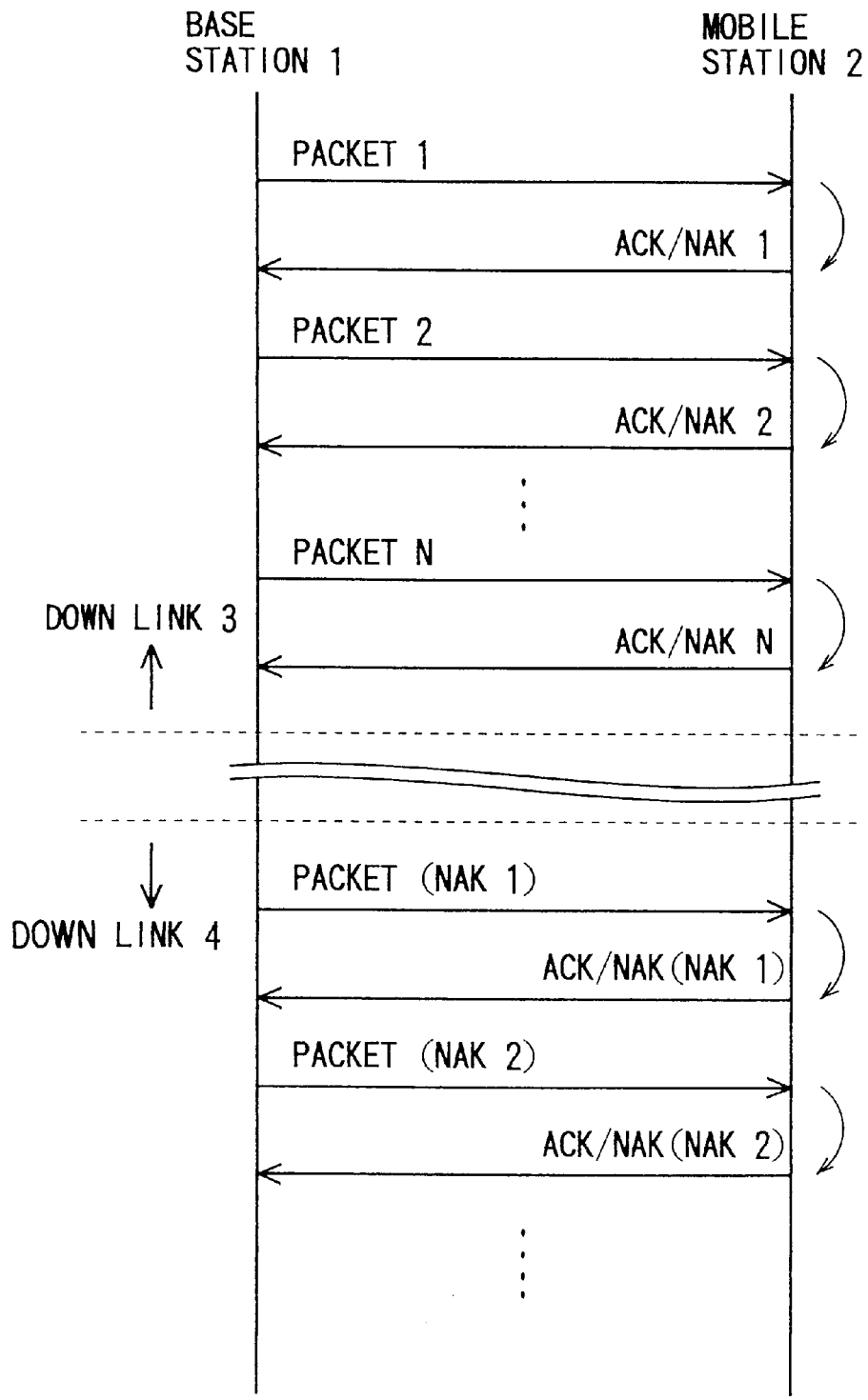
F I G. 8

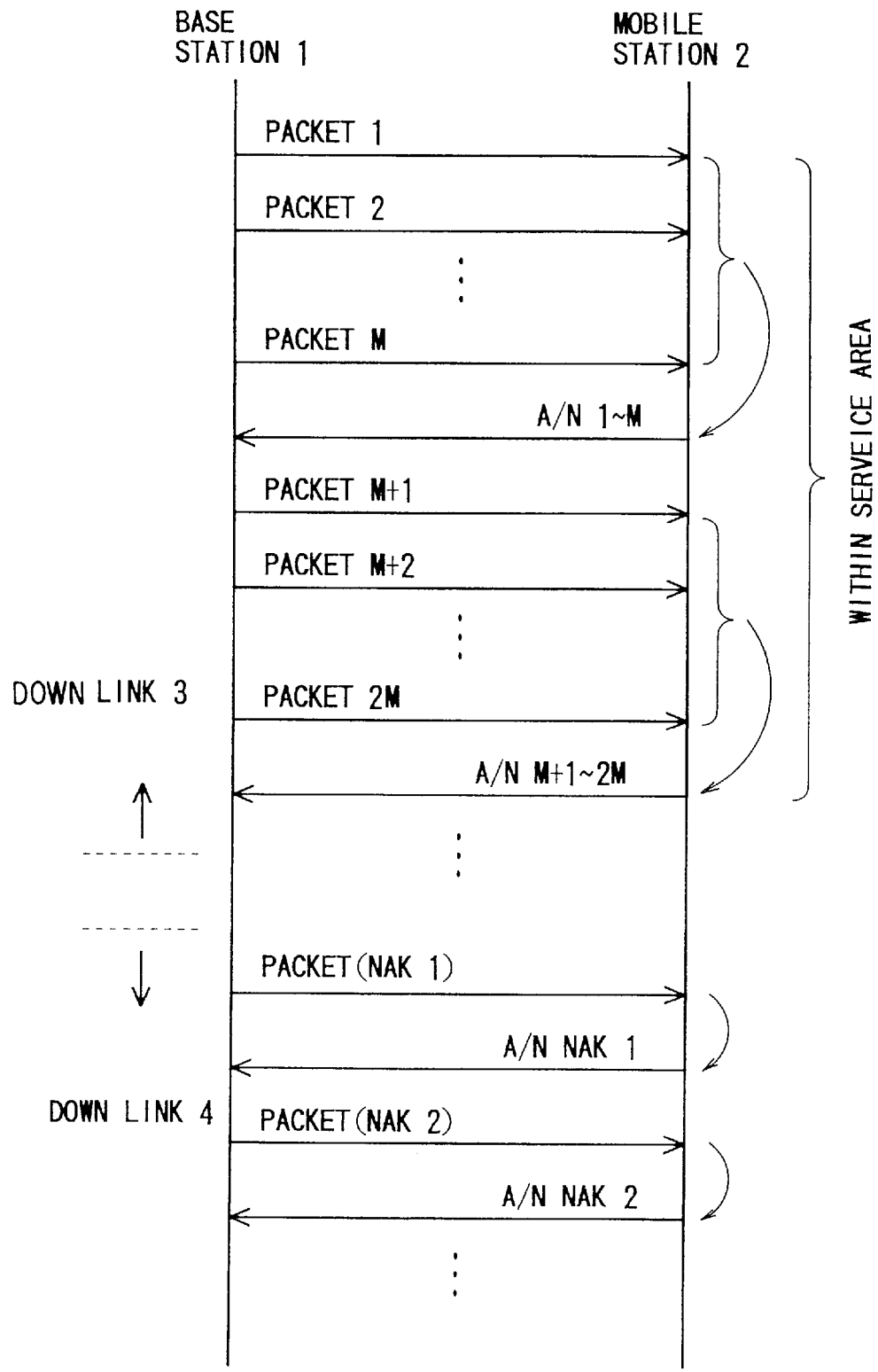
F I G. 10

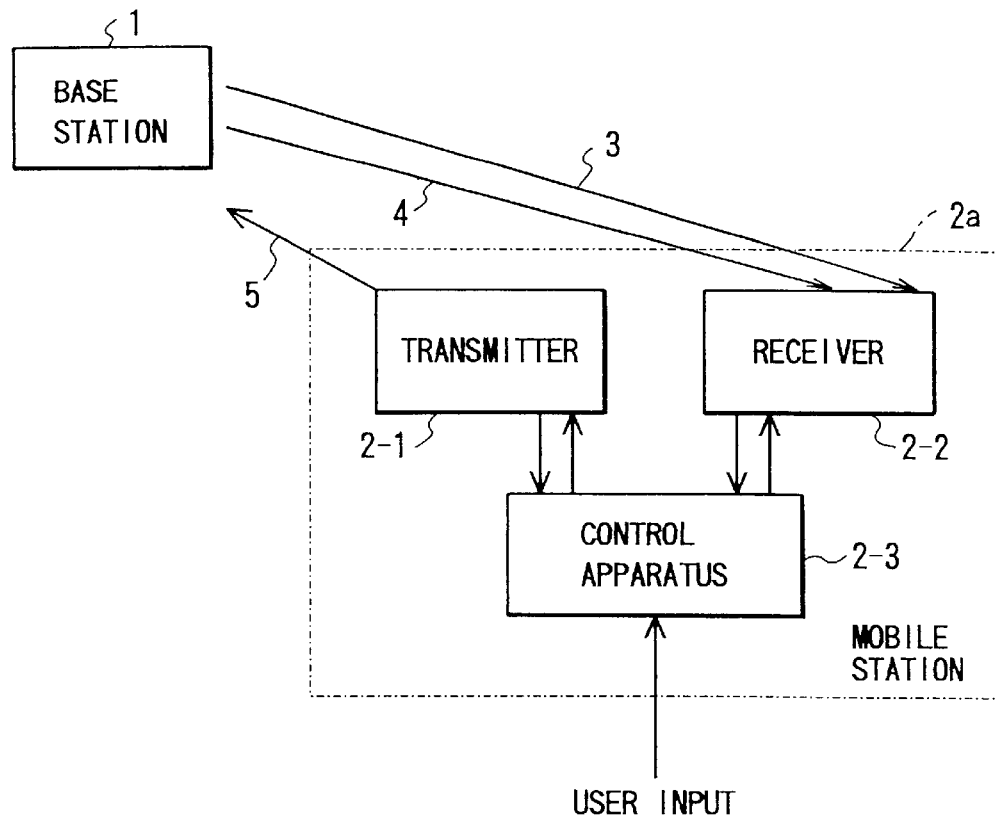
F I G. 11
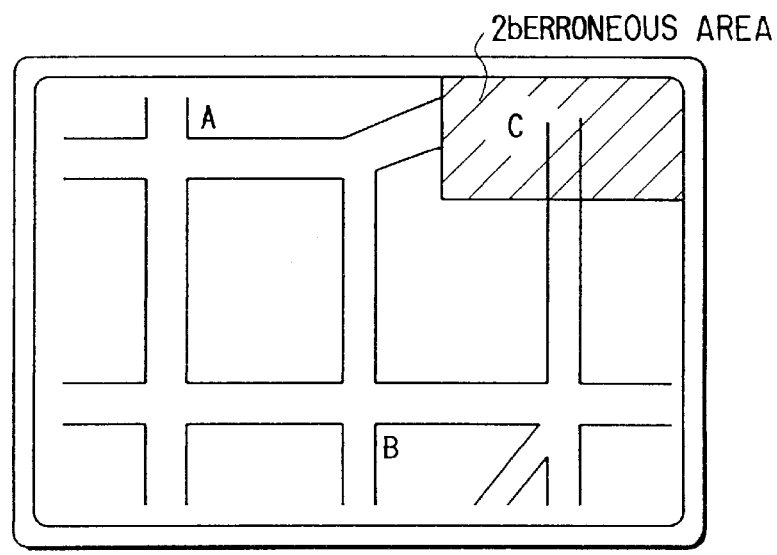
F I G. 12

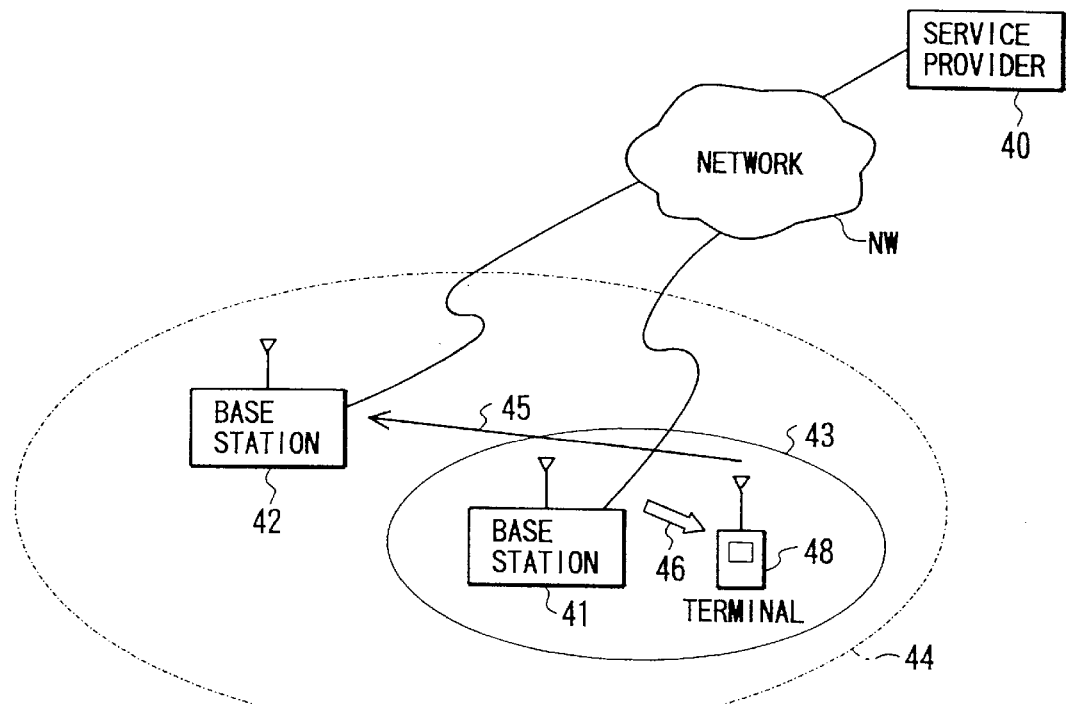
F I G. 16
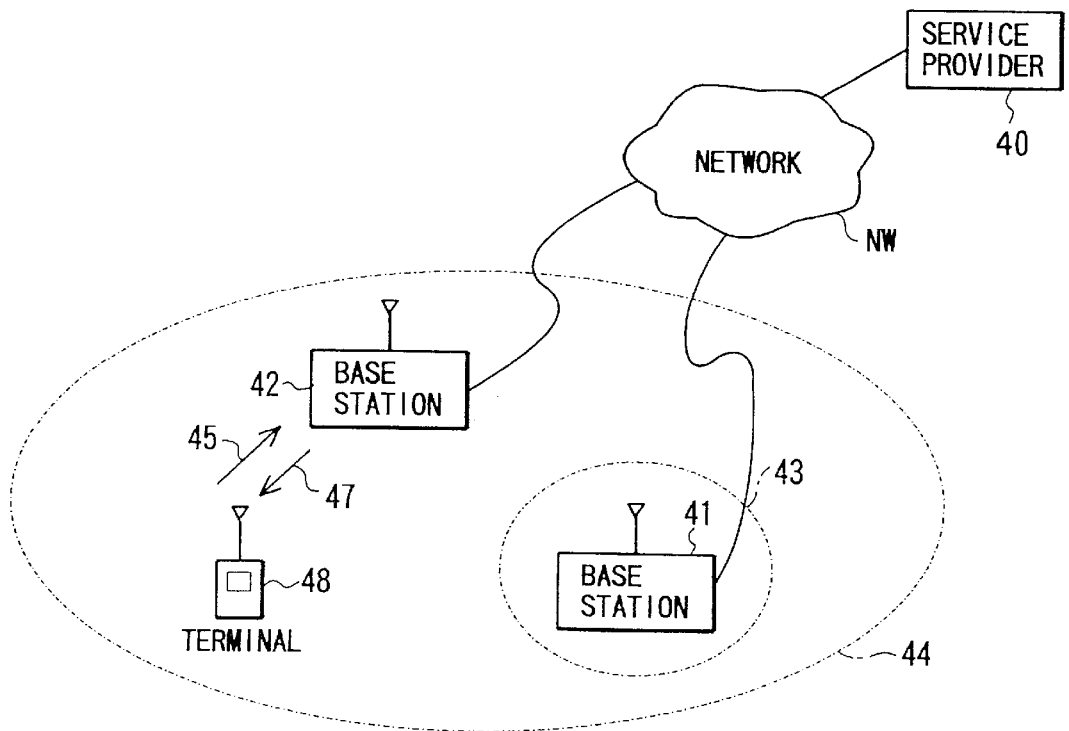
F I G. 17

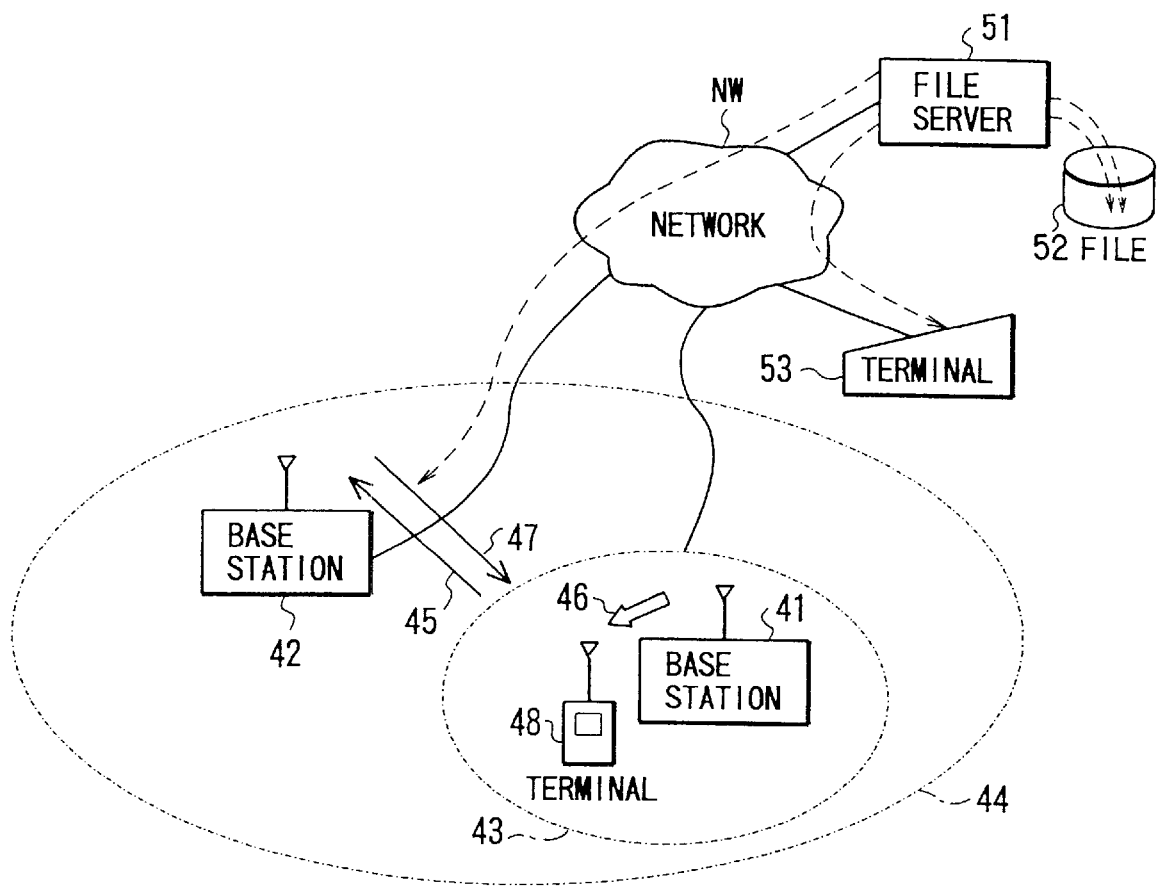
F I G. 18
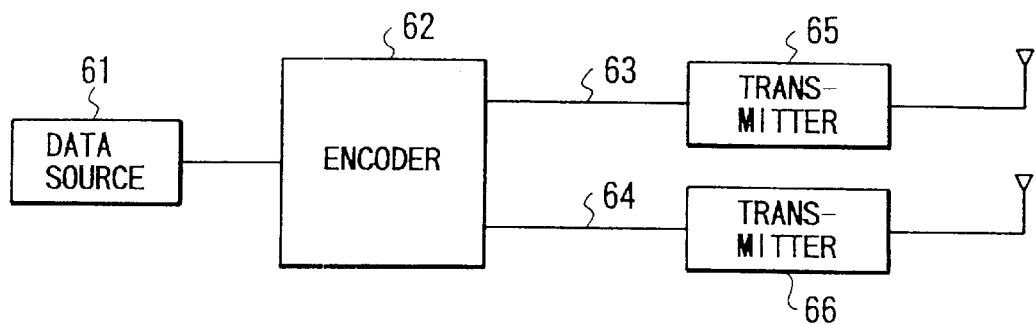
F I G. 19

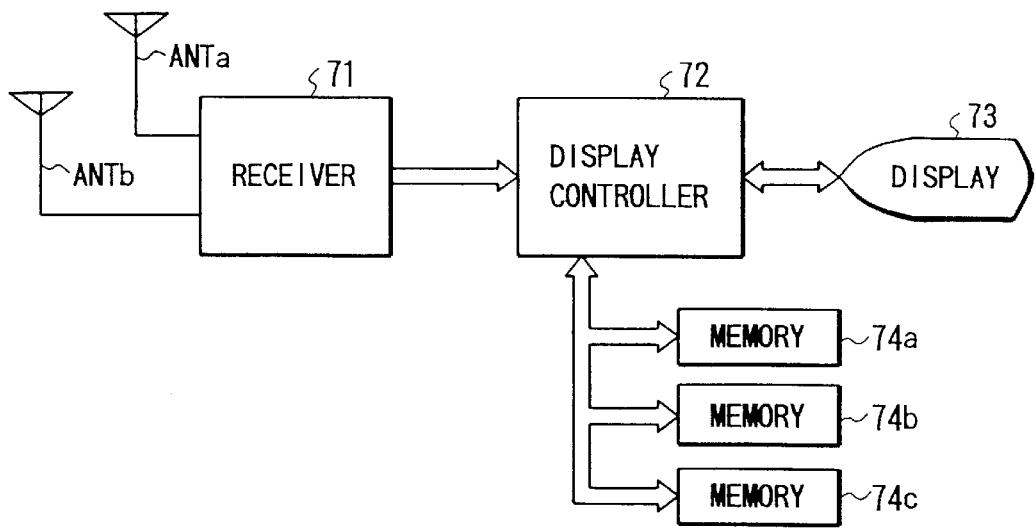
F I G. 22
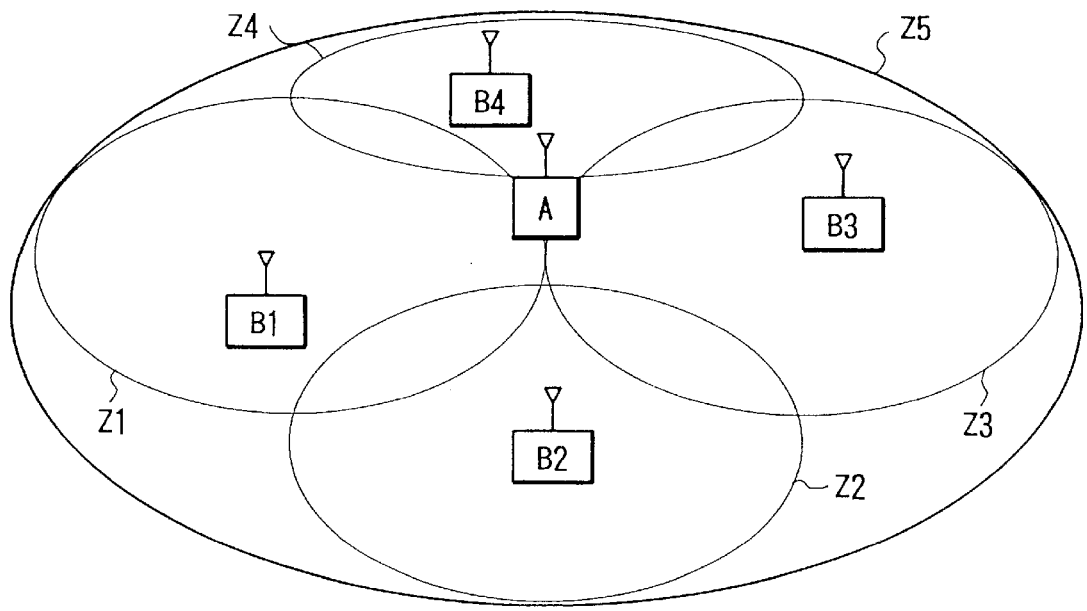
F I G. 23

RADIO COMMUNICATION SYSTEM HAVING RE-SEND CONTROL METHOD

BACKGROUND OF THE INVENTION

1. Field of the Invention

The present invention relates to a radio communication system, and more particularly to a method of re-send control and transmission control of data.

2. Description of the Related Art

In the personal radio communication apparatus as represented by mobile telephone, mobility of the apparatus is demanded. Therefore it is required to be capable of communicating while moving, and to be portable easily, that is, the apparatus itself should be reduced in size.

In the latter point, in particular, it is important to reduce the size of the battery which occupies a considerable portion of the weight and volume of the terminal, and, in turn, it is important to reduce the power consumption of the apparatus.

On the other hand, in the conventional radio data transmission system, generally, the reception side checks if there is any error in data or not when receiving, and requests re-send to the transmission side if error is found in the data, and the transmission side re-sends according to this request.

Herein, the re-send control method in the conventional radio data transmission system is described while referring to FIG. 1.

FIG. 1 shows a conventional radio data transmission system. In FIG. 1, a base station 101 which is usually wired to the network transmits data by radio to a second mobile station 102. A service area 103 shows a range in which the base station 101 can transmit data.

In such radio data transmission system, hitherto, data is divided into several units (this unit is called a packet), and a parity bit for error detection is added to each packet, and is transmitted from the base station 101 to the service area 103 by radio, and the mobile station 102 receives it. In the mobile station 102, every time a packet (data packet) is received, it is checked if error is contained in the received packet or not, and if an error is found, it requests re-send of the packet containing the error immediately to the base station 101, and the base station 101 re-sends this packet containing error to the mobile station 102 according to the re-send request.

The sequence of re-send control method is explained below by referring to an example of "stop-and-wait" method shown in FIG. 2.

A sequence number and redundancy bits for detecting error are added to a data packet. First, N-th data packet is transmitted from the base station 101 to the mobile station 102. In the mobile station 102, presence of error is checked by using the redundancy bits for detecting and correcting error. When no error is found, as shown in FIG. 2, ACK (affirmative response) showing that the N-th data packet is received correctly is transmitted to the base station 101.

The base station 101, when receiving ACK, transmits the next (N+1)-th data packet to the mobile station 102. In the second base station 102, checking error similarly, and if error is found, as shown in FIG. 2, NAK (negative response) showing that error is contained in the (N+1)-th data packet is transmitted to the first base station 101.

The base station 101, when receiving NAK, re-sends the (N+1)-th data packet to the mobile station 102. In the second base station 102, checking error similarly, and when no error is found, as shown in FIG. 2, ACK showing that the (N+1)-th data packet is received correctly is transmitted to the base station 101. After receiving ACK, the base station 101 transmits next data to the mobile station 102.

Such operation is repeated to transmit data.

As the method of re-send control, aside from such "stop-and-wait" method, "go-back-N" method and selective repeat method are known among others, but basically the control method is same in that data is retransmitted when NAK is received.

Incidentally, in data transmission, such data re-send means that the mobile station 102 cannot leave the service area 103 of the base station 103 until the data re-send is over. This is very inconvenient, if the mobile station 102 is a mobile terminal, because the moving is limited.

To prevent such problem, a method of changing over the base station to transmit data is known. As a representative example, the system of portable telephone is known, which is briefly described by reference to FIG. 3.

In FIG. 3, the mobile station 101 which is a mobile terminal (a portable telephone in this case) is supposed to be first communicating in the service area 103 of the base station 101 which is a certain regional base station. Suppose this mobile station 102 is moved to a service area 105 of another base station 104 which is a different regional base station in the midst of communication. At this time, the network 106 of telephone system has a function of detecting that the mobile station 102 is moved from the service area 103 of the base station 101 to the service area 105 of the other base station 104, and making the communication to the mobile station 102 available through the service area 105 of the other base station 104, thereby changing over the station to communicate with the mobile station 102 from the base station 101 to the other station 104. It is hence possible to satisfy the requirement for mobility of the system in the personal communication apparatus.

In the radio communication system for transmitting data by packet communication or the like, between the data (data packet) sending side and receiving side, data transmission, data error check, re-send request if error is found, and re-send of data requested to send again are carried out in a series of (one) communication occasion. This is extremely useful when real time is required in communication, but real time is not required in all data communications. For example, in distribution of less urgent message, or newspaper articles or magazine articles to subscribers, it is not so urgent that the data should be sent again immediately if error is found.

Seeing that there are many applications in which real time is not required, data re-send is not always required to be done instantly. In the conventional system, it is done automatically and instantly. For immediate re-send control, the demodulator in the personal communication apparatus of the terminal possessed by the user must continue to be operated at high speed after the data is sent. As mentioned above, in personal communication, reduction of power consumption is important. However, even when real time is not required, the circuit for error checking is operated, or the re-send requesting circuit is operated, and the conventional system is disadvantageous from the viewpoint of power consumption.

In addition, from the viewpoint of effective use of radio frequency band that must be shared by multiple users (effective use of radio resources), although it is particularly needed in personal communication, re-send control is done immediately even when it is not necessary that data should be sent without error in real time, and the channel is occupied without need, and the effective use of radio resources is impaired, and the use by others is blocked.

Recently, in particular, the multimedia is attracting attention, and the radio communication system capable of exchanging moving picture, voice and data is increasing its importance, and a colossal quantity of data must be sent in a short time, and it requires transmission speed of as high as 100 Mbps or more.

For such high speed transmission, a frequency band of 100 MHz is needed, and when using such broad frequency band as transmission path for radio communication, as a matter of course, re-send control for such less urgent data is a mere waste of radio resources. Its improvement is keenly demanded.

Further, in the case of radio transmission, effective utilization of channel by rational transmission of data is also a natural request in the society. In the conventional radio communication, the mainstream is the system using one up-link channel and one down-link channel having same transmission speed, and data is transmitted by using a pair of channels.

On the other hand, the data to be transmitted is coded in order to compress the volume as much as possible in the case of large capacity data such as picture. There is provided an example of data compression in which original data is first sent and then only changed portions of the data are sent. According to this example, the data is classified into initial data and additional data, and then the initial data and the additional data are respectively coded. For example, in image coding of video picture, about 60 frames are needed per second, and according to this method, the first frame is transmitted as it is, and from the subsequent frames, only the difference from the previous frame is sent. This method is utilized in MPEG2 (Moving Picture Experts Group 2) and others. In another method, incidentally, a specific range on the screen is regarded as one object, and the moving direction of this object in the next frame is transmitted. In coding of voice, having a common dictionary (code book) at the transmission side and reception side, it is proposed to decrease the quantity of data to be transmitted by consulting the dictionary (CELP: Code Excited Linear Prediction method). When coding the voice, its spectrum is analyzed, and the optimum patterns is referred to from the code book depending on the result of analysis, and transmitted. Herein, the common dictionary stores fixed initial data that is not changed during communication, and only the result by referring to the code book is the additional data that is changed during communication, and only this additional data is usually transmitted in communication.

More recently, Telescript is known as one of the representative advanced forms of language for communication. It is intended to transmit simultaneously the message of the data to be transmitted, and the program describing the processing about the content of the message or the message itself. The message is the initial data, and by processing this message as initial data by the program, the data can be taken out. The message is the initial data, and the program is the additional data.

Thus, in data transmission, the forms of initial data and additional data are used in many of the coding and describing methods. As the method of transmission data in such forms by radio communication, hitherto, the method shown in FIG. 4 is employed.

As shown in the diagram, the data generated in a data source 81 is divided into initial data and additional data, and coded in an encoder 82. The coded initial data and additional data are multiplexed in time according to a predetermine rule in a multiplexer 83. At this time, whether the transmitted data is initial data or additional data is distinguished by the data bit added thereto. The multiplexed signal is modulated into a radio signal in a transmitter 84, and is transmitted from an antenna 85.

At the receiving side, the radio signal received by an antenna 86 is demodulated in a receiver 87, and is delivered from an output terminal 89. In a decoder 88, the data is decoded by distinguishing whether the demodulation signal series is initial data or additional data by the added data bit.

Thus, hitherto, data is transmitted in one channel regardless of the type of data.

Other prior art is explained by referring to FIG. 5.

In mobile radio communication, a method of disposing the service area (cell) covered by one base station hierarchically is known. In FIG. 5, a base station 201 covers a wide area 202. A base station 203 covers a small area 204, and a base station 205 covers a small area 206.

The base stations 203 and 205 cover the small areas 204 and 206 limited by spot beam, in which the transmission distance is short, and a large capacity of data can be transmitted at high speed. The base station 201 covers by a wide-range beam, there are many users in the wide area 202, and the band that can be transmitted by one user is limited, and data is transmitted only at low speed.

In such hierarchical cell arrangement, conventionally, images of large capacity are communicated by spot beam, while voice of small data quantity, or rough image or still picture of small number of pixels is transmitted by wide-range beam, and thus the roles are generally divided. In other manner of using the hierarchical cells, for example, only exchange of radio control signal necessary for radio communication is done by wide-range beam, and data communication is done by spot beam only.

In the prior art shown in FIG. 4, regardless of the content of the data, data is transmitted by using the channels of specific transmission speed. Generally, the initial data is large in the data quantity to be transmitted at a time as compared with the additional data. Thinking of image, as the initial data, the whole data of one frame must be directly transmitted, while the additional data is smaller in the data quantity as compared the initial data. To transmit moving picture without time delay, a high speed channel enough to transmit the initial data without delay is required, but such high speed channel is not required for transmitting additional data, and the frequency cannot be utilized effectively. From the viewpoint of effective utilization of frequency, if the circuit of such a transmission speed as to transmit additional data only is used, it takes a very long time to transmit the initial data, and therefore the data cannot be transmitted in real time, and time delay is caused.

A method of varying the transmission speed by one channel is also proposed, but anyway since the same channel is used physically, it requires an apparatus for realizing maximum transmission speed in a service area. To realize variable transmission speed, different transmission speeds must be realized by using a same apparatus in a same frequency band. It does not matter much as far as the radio of data quantity to be transmitted per unit time is small between the initial data and additional data, but it is a serious problem if the data differs by two digits or more. Supposing the transmission speed of initial data to be 10 Mbps and that of additional data to be 10 Kbps, the frequency band for transmitting additional data is sufficient at around 1 GHz. By contrast, however, since the initial data is high in transmission speed, it is difficult to transmit in 1 GHz band. This is because that the frequency bandwidth assigned for such data communication service is, at most, about several MHz to several tens of MHz around 1 GHz, considering the present situation of utilization of radio waves. To transmit the initial data in such frequency band, one user occupies 10 MHz of this bandwidth, which is nearly impossible to realize. Considering transmission of initial data, it may be possible to use a millimeter wave band of about 60 GHz which is a presently free frequency band. In the millimeter wave band, the area that can be covered by one base station is about several to several tens of meters due to the wave propagation characteristic. To transmit at variable transmission speeds in this frequency band, multiple base stations must be installed, which lead to increase of cost for infrastructure.

On the other hand, in the prior art in FIG. 5, depending on the type of data such as image and voice, it is determined whether to transmit by spot beam or to transmit by wide range beam. Or the spot beam or wide range beam is determined depending on whether it is control data on the radio communication protocol or data to be transmitted by the user. In this case, the problem is that the available service is extremely limited in the point of wide range beam.

SUMMARY OF THE INVENTION

Accordingly, it is an object of the present invention to provide a radio communication system of re-send control method capable of reducing power consumption in applications not requiring real time service, and effectively utilizing the radio resources.

It is a second object of the present invention to provide a radio communication system capable of effectively utilizing the channel by rational transmission of data in radio transmission.

According to the present invention, there is provided a radio communication system relating to a radio communication system for making radio communications between a base station for transmitting data and a mobile station for receiving data, comprising a down-link channel from the base station to the mobile station, and an up-link channel from the mobile station to the base station, wherein the transmission speed of the down-link channel is faster than the transmission speed of the up-link channel, and when transmitting data from the base station to the mobile station by dividing into several units (packets), first whole or part of the data is transmitted from the base station to the mobile station in batch by the down-link channel, the mobile station check error in the transmitted data in each packet, requests re-send of data contained in the packet having error, and re-sends by the down-link channel as for the re-send requested packet in other occasion of communication later in time than the initial data transmission.

According to the present invention, there is provided another radio communication system comprising a first down-link channel transmitting from a base station to a terminal at a first transmission speed, a second down-link channel for transmitting from a base station to a terminal at a second transmission speed slower than the first transmission speed, and an up-link channel for transmission from a terminal to a base station at the second transmission speed, wherein when the data to be transmitted from a base station to a terminal is classified into initial data and additional data, the initial data is transmitted by the first down-link channel and the additional data is transmitted by the second down-link channel.

According to the present invention, by re-sending later as for the application where real time service is not required, the power consumption is reduced, while the radio resources can be utilized effectively. The present invention also presents a radio communication system capable of utilizing the channel effectively by rational transmission depending on the type of the data.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 8 is a diagram for explaining the procedure of re-send control in the first embodiment;

FIG. 10 is a diagram for explaining the procedure of re-send control in a third embodiment;

FIG. 11 is a diagram showing the constitution of a terminal in a fourth embodiment of the present invention;

FIG. 12 is a diagram showing an image example transmitted in the fourth embodiment;

FIG. 16 is a conceptual diagram showing an example of operation in the sixth embodiment;

FIG. 17 is a conceptual diagram showing an example of operation in the sixth embodiment together with FIG. 16;

FIG. 18 is a conceptual diagram another example of operation in the sixth embodiment;

FIG. 19 is a block diagram showing a constitution of a transmitter at data provider side in a seventh embodiment of the present invention;

FIG. 22 is a diagram showing a constitution of a terminal apparatus in the seventh embodiment; and FIG. 23 is a diagram showing a modified example in the seventh embodiment.

DETAILED DESCRIPTION OF THE PREFERRED EMBODIMENTS

A preferred embodiment of a radio communication system according to the present invention will now be described with reference to the accompanying drawings.

The present invention is effective in any radio communication system, and is particularly effective in the following radio communication system. In view of multimedia communication, with the purpose of communicating at high speed, utilizing the frequency effectively, and using the small-sized, high-function, portable radio communication terminal for the convenience of use and portability of user's side, a radio communication system having asymmetric transmission speeds (called SDL or super high speed down-link system) having the transmission speed of the down-link channel from a base station to a terminal one digit or more higher than the transmission speed of the up-link channel from a terminal to a base station has been recently developed. This SDL system is filed in Japanese Patent Application No. 7-176791 by the assignee of the present invention.

Figure 1:
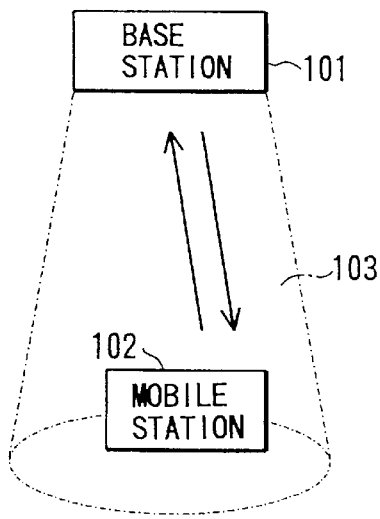
FIG. 1 is a structural diagram of a first prior art of a radio communication system.
Figure 2:
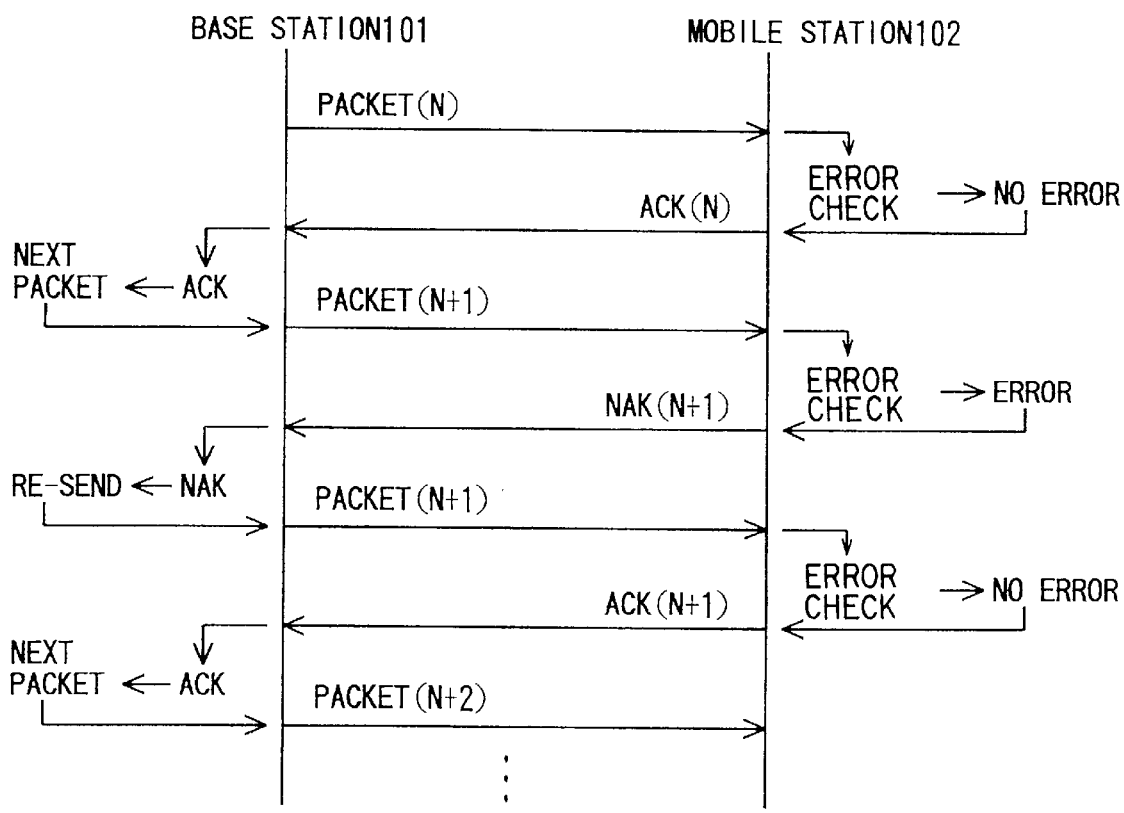
FIG. 2 is a diagram for explaining the procedure of re-send control in the first prior art.
Figure 3:
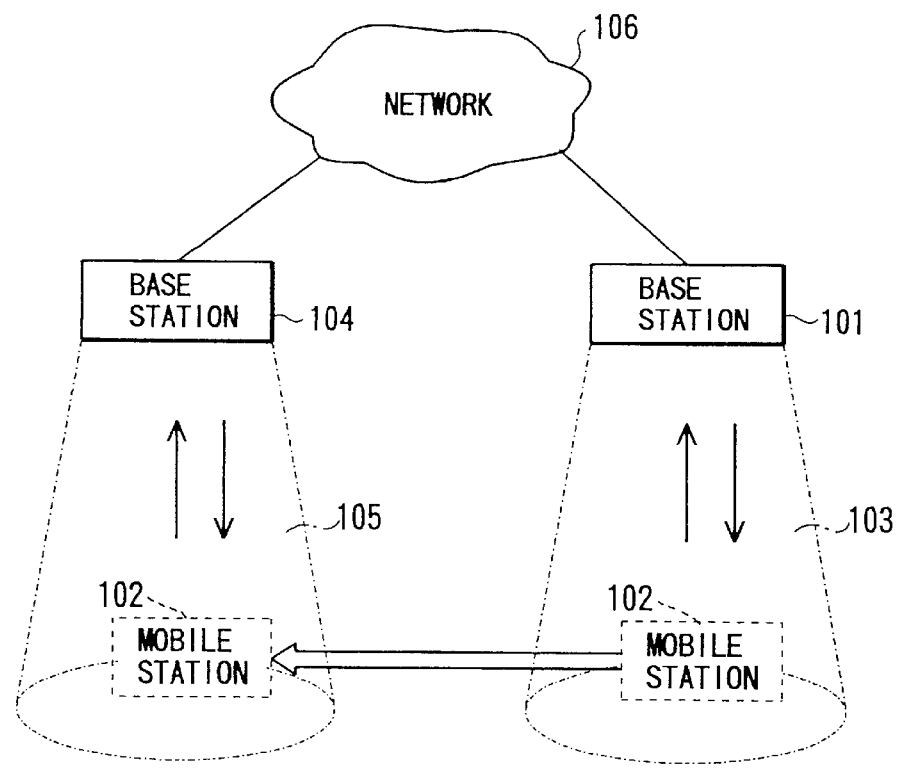
FIG. 3 is a structural diagram of a second prior art of a radio communication system considering movement of a mobile terminal.
Figure 5:
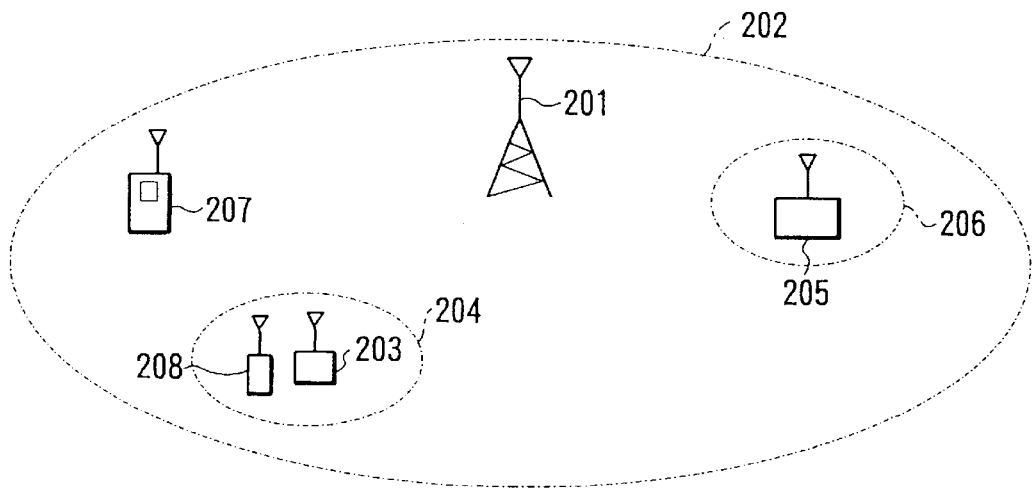
FIG. 5 is a diagram for explaining a fourth prior art.
Figure 4:
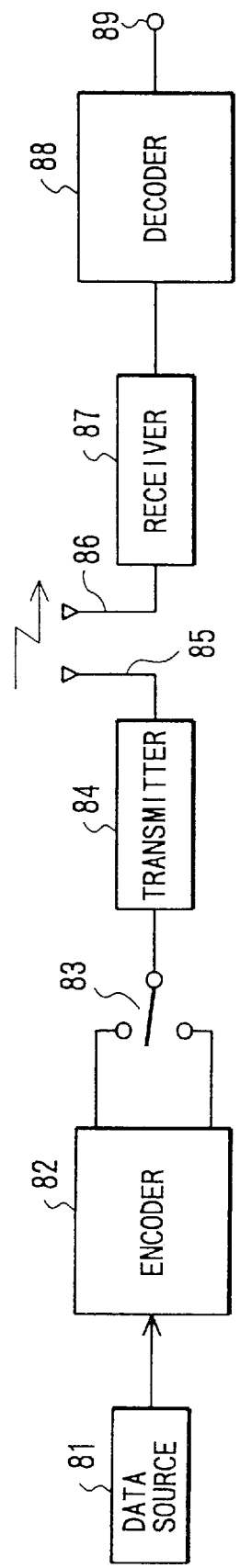
FIG. 4 is a diagram for explaining a third prior art.
Figure 6:
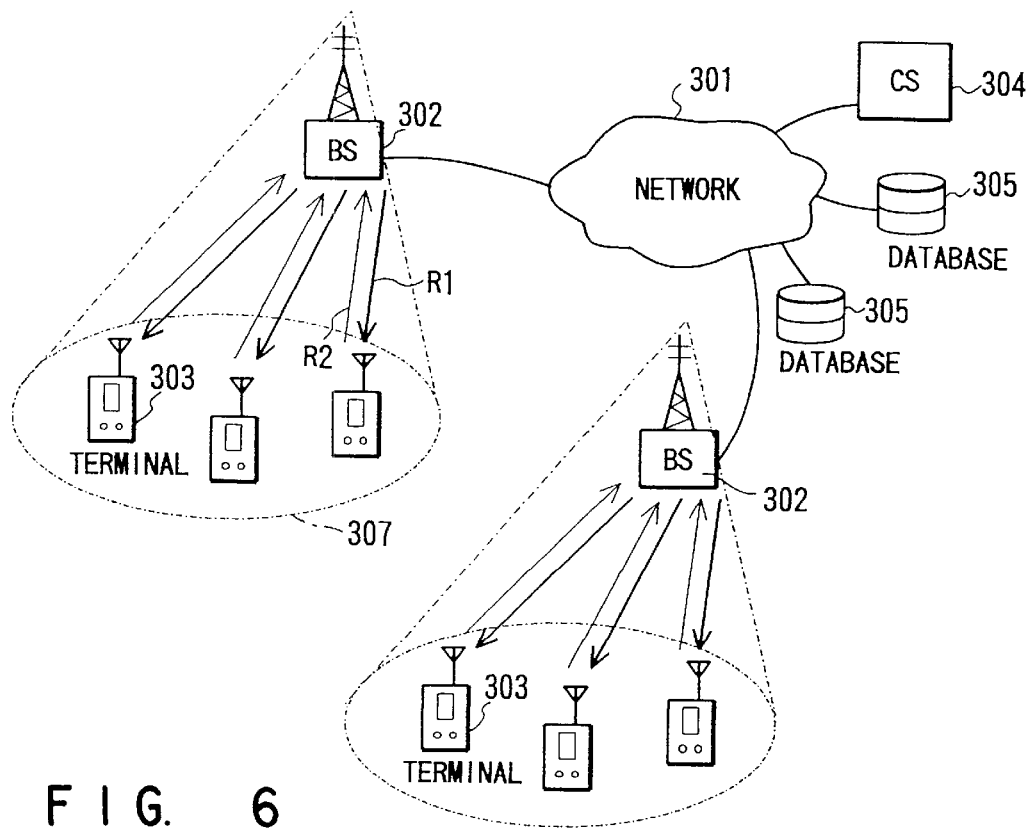
FIG. 6 is a diagram for explaining the constitution of a radio communication system as a preliminary condition of the present invention.

An outline of this SDL system is shown in FIG. 6. Base stations 302 are linked to a network 301, and each base station 302 has a down-link channel R1 having a wide frequency band, and an up-link channel R2 having a narrow frequency band. Each base station 302 can communicate with a terminal 303 in a service area 307 that can communicate by the down-link channel R1, by using the down-link channel R1 and up-link channel R2, and can exchange data with the terminals each service area 307 including the movable terminal (mobile terminal) 303, and control system 304, database 305 and others linked to the network 301.

Herein, the terminal carried individually is generally a personal machine for input and output by a user. Therefore, the transmission capacity and method matched with the quantity of data transmitted and received by a single user. Being carried individually, such personal terminal is, of course, demanded to be smaller in size and lighter in weight, and power saving not demanding to carry an extra heavy battery is also required.

Considering the application of the terminal carried individually, in such terminal, assuming, for example, multimedia, appreciation of movie, appreciation of music, shopping, use of database, talk, transfer of document, transmission of sales data or reservation data, booking of ticket, and data acquisition (reading) of mass media such as periodicals and newspapers may be included, and what must be transmitted from terminal side to base station is the voice, document data, reservation data, command and others, and they can be suppressed to several kilobits per second by combining with data compression technology, and extremely high speed transmission is not required.

On the other hand, high speed transmission is most needed in image data such as movie (moving picture), and high speed transmission of such large volume of data is required only in the down-link channel from the base station side to the terminal. Considering this situation, from the viewpoint of effective utilization of frequency band, the wide band (that is, high speed transmission) is used only in the down-link channel from the base station side to the terminal, and a transmission path of only narrow band (that is, low speed transmission) is enough for the up-link channel from the terminal side to the base station (up-link to the base station side).

Hence, in the SDL system, as mentioned above, the basic constitution has asymmetrical transmission speeds consisting down-link channel of wide band and high speed, and up-link channel of narrow band and low speed.

The relation between the base station 302 and terminal 303 capable of communicating by radio in this SDL system is more specifically described below.

The base station 302 and the portable terminal 303 which is a mobile terminal that can communicate by radio located within its service area 307 can communicate with each other by using the down-link channel R1 of wide band from the base station 302 to the terminal 303 and the up-link channel R2 of narrow band from the terminal 303 to the base station 302 provided between them as radio channels.

In the SDL system, in the down-link channel R1, data is transmitted in wide band (for example, 100 Mbps or more). Accordingly, to realize the SDL system by radio transmission using radio waves, a frequency bandwidth of 100 MHz (however, when multi-level modulation is not done) must be prepared. Waves are less likely to have communication troubles due to obstacles when the frequency is lower, and the low frequency band is desired, but the low frequency band has been already assigned for various applications.

As a next best measure, it is preferred to use microwave band, but in the microwave band, it is a problem that one user occupies a very broad bandwidth of over 100 MHz, and it is not realistic.

Therefore, to keep a bandwidth of 100 MHz or more, it is necessary to use a highly directive quasi-millimeter wave band or millimeter wave band, or infrared ray having no limit in frequency band, etc. When using quasi-millimeter wave band, millimeter wave band, or infrared ray, it is required to communicate within a visible range, and the attenuation increases corresponding to the propagation distance, and various difficulties remain unsolved for its realization also from the viewpoint of saving of energy.

Further, the down-link channel R1 of wide band is used within a visible range, and hence the service area is narrow, and it is hard to develop the service area densely over a wide range. Accordingly, in order to offer service in a wide range, the down-link channel of narrow frequency band is extended. The extended down-link channel has a narrow frequency band, and hence the transmission speed is low, but since the band is narrow, the microwave band can be used, so that the service area is wide.

In the present invention, hence, in the service area by a wide band in a limited narrow region (the service area by the down-link channel R1 of wide region), in order to use effectively without occupying the radio resources by one user, error control is not executed, and reception data having error is re-sent through the down-link channel of narrow frequency band.

On the basis of communication in visible range, in the present invention, the following embodiments are disclosed for the purpose of saving power, and obtaining high communication quality to be utilized effectively, without occupying the radio resources by one user, while keeping the degree of freedom of terminal (mobility).

(First Embodiment)

Figure 7:
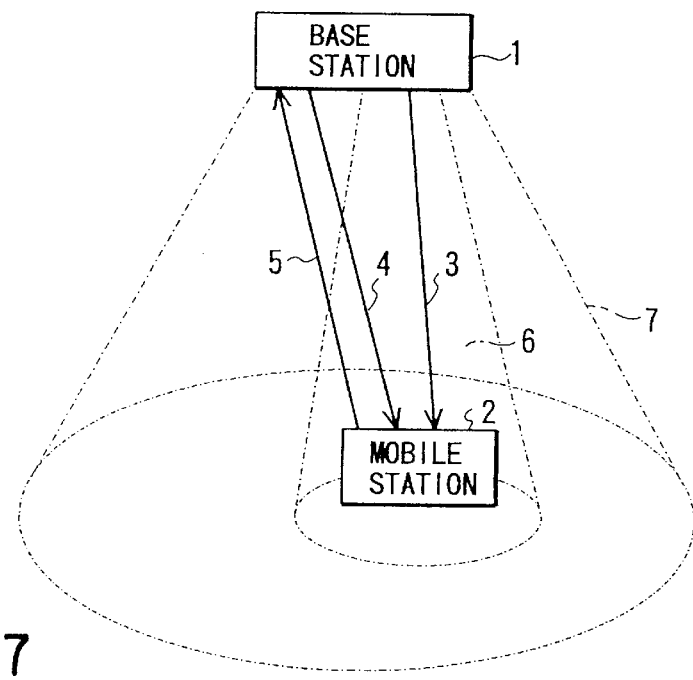
FIG. 7 is a system configuration diagram of a first embodiment of the present invention.

FIG. 7 is a block diagram showing a constitution of a first embodiment of a radio communication system of the present invention. Usually, a base station 1 wired to a network is a mainly data transmitter station, and a mobile station 2 is mainly a data receiver station. From the base station 1 to the mobile station 2, there are two down-link channels 3 and 4, and there is one up-link channel 5 from the mobile station 2 to the base station 1. A first service area 6 denotes the service area of the first down-link channel 3, and a second service area 7 indicates the service area of the second down-link channel 4.

The down-link channel 3 is a channel keeping a wide frequency band for the purpose of high speed transmission, and the service area is narrow because waves of short wavelength are used. Therefore, the first service area 6 is narrow. The down-link channel 4 is a channel keeping a narrow frequency band, and waves of relatively long wavelength are used, and the service area is wide. Hence, the second service area 7 is wide. The up-link channel 5 is also a channel keeping a narrow frequency band, and waves of relatively long wavelength are used, and the service area is wide.

The operation of the first embodiment thus constituted is described below referring to a data flow in FIG. 8.

Data packets transmitted from the base station 1 to the mobile station 2 by using the first down-link channel 3. In the mobile station 2, error is checked in each packet, and ACK (affirmative response) or NAK (negative response) is transmitted through the up-link channel 5 depending on the result of checking. At this time, the base station 1 does not re-send, but stores data of which packet to be re-sent. On other occasion of communication, the base station 1 re-sends the re-send requested packet by using the second down-link channel 4.

In this packet re-send, the conventional re-send control method may be used, or the re-send control method of the present invention may be used repeatedly.

In response to ACK/NAK from the mobile station 2, whether the base station 1 must re-send immediately or not is determined by the service quality of the call about the data transmission.

In the first embodiment, the series of operation from sending of data from the base station to the mobile station and data error checking in the mobile station, to requesting of re-send to the base station from the mobile station on the basis of checking is conducted in one occasion of communication, and after a certain time, re-send data is transmitted by using other channel, and therefore when transmitting data not requiring real time service, the down-link channel used in the first occasion of communication can be released soon, so that the radio resources can be utilized effectively.

According to the re-send control method of the present embodiment, since the first down-link channel used first in data transmission is high in speed, the first data transmission can be finished in a short time, and the channel can be released soon, which contributes to effective utilization of the radio resources.

Other embodiments of the radio communication system according to the present invention will be described. The same portions as those of the first embodiment will be indicated in the same reference numerals and their detailed description will be omitted.

(Second Embodiment)

Figure 9:
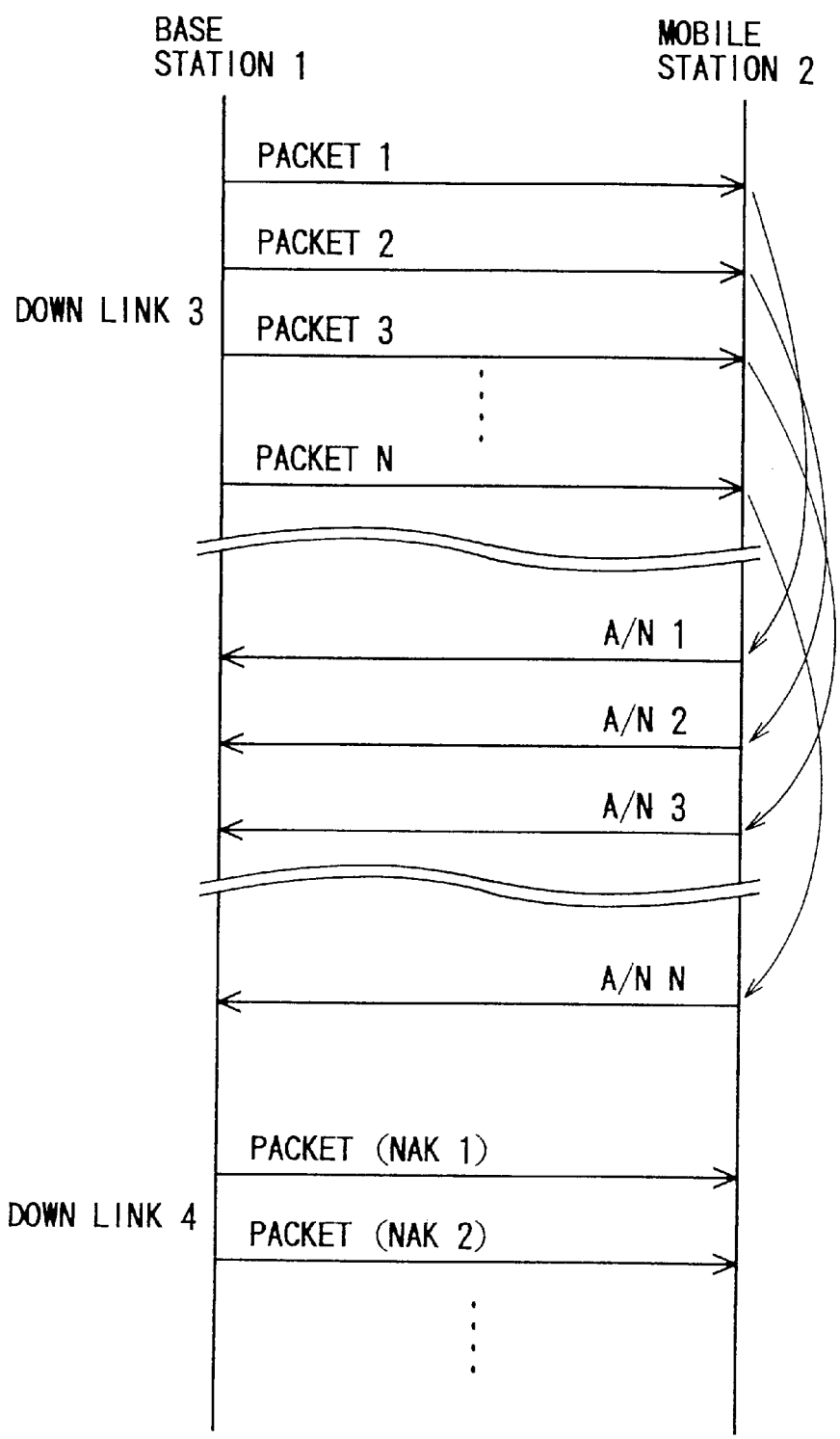
FIG. 9 is a diagram for explaining the procedure of re-send control in a second embodiment.

The constitution of a second embodiment is same as in the first embodiment shown in FIG. 7. The operation of the second embodiment is explained by referring to the data flow in FIG. 9.

From the base station 1 to the mobile station 2, first all data packets are transmitted through the first down-link channel 3. After all packets are transmitted, the mobile station 2 checks for error, and transmits ACK (affirmative response) or NAK (negative response) by using the up-link channel 5 depending on the result of checking. At this time, the mobile station 2 does not transmit re-send request, but stores data of which packet containing error. The mobile station 2, on other occasion of communication, transmits re-send request by the up-link channel 5, and the base station 1, receiving it. At this time, the base station 1 does not re-send, but stores data of which packet to be re-sent. The base station 1, on other occasion of communication, re-sends the requested packet by using the second down-link channel 4. At this time, in packet re-send, the conventional re-send control method may be used, or the re-send control method of the present embodiment may be used repeatedly.

According to the second embodiment, aside from the same effects as in the first embodiment, by requesting re-send on other occasion of communication, it is not necessary to check data errors in the midst of the first occasion of communication, and hence the circuit for error detection can be operated slowly, so that the power consumption may be saved.

In the first embodiment and second embodiment, the first down-link channel 3 is faster in transmission speed than the second down-link channel 4, but this is not limitative, and the transmission speed may be same.

(Third Embodiment)

In the first and second embodiments, the first down-link channel 3 is faster in transmission speed than the second down-link channel 4. That is, in ordinary service, re-send is not very frequent, and the most communication time is spent in transmission of data by the down-link channel 3, and therefore the faster transmission speed of the first down-link channel 3 is effective for transmission time. In a third embodiment, to further enhance this effect, the data flow is modified as shown in FIG. 10.

That is, in FIG. 10, from the base station 1, data packets are transmitted by using the first down-link channel 3, but plural responses to plural data packets are processed by one re-send request. Therefore, if the first down-link channel 13 is too fast and the transmission speed of the up-link channel 5 cannot catch up, re-send can be controlled.

It is particularly effective when the communication range of the first down-link channel 3 and second down-link channel 4 is a hierarchical structure as shown in FIG. 7. This is the structure making use of the characteristic that communication of high transmission speed is generally narrow in communication range as compared with that of low transmission speed. That is, such structure is effective for enhancing the mobility of the mobile station.

Suppose a constitution in which high speed down-link channels 3 are disposed in spots and low speed up- and down-link channels 5 and 4 are arranged in a wide rang e as shown in FIG. 7. When the high speed channel is 100 Mbps, in this embodiment, the user staying in the spot beam only receive the data by down-link at 100 Mbps. Hence, the throughput which is a substantial transmission rate is obtained nearly at 100 Mbps almost in all cases.

Support sing the packet error rate to be around $10^{-3}$, considering the time necessary for re-send corresponding to the data quantity to be re-sent, if re-send of all packets is complete in one re-send, it results in 100 Mbps×transmission time×$10^{-3}$, which is very small. Hence, in the case of re-send data only, if transmitted in the channel of low transmission rate, much delay does not occur.

Furthermore, in the constitution of the present embodiment shown in FIG. 7, since the down-link channel 3 is fast in transmission speed, the carrier frequency must be sufficiently high in order to keep the band. However, transmission errors are generally likely to occur in the transmission using high frequency. Still more, the service area is generally narrow because of the straightforwardness of high frequency radio wave.

On the other hand, the down-link channel 4 is low in transmission speed, and the carrier frequency is not required to be high, and hence the transmission quality is excellent. With such property, the down-link channel 3 of fast transmission speed high in carrier frequency is used in first transmission of large capacity, and the low carrier frequency of high quality is used for re-send which is generally small in transmission capacity, and therefore the transmission quality can be enhanced on the whole, and the present embodiment is known to be suited to transmission service of large capacity data.

According to the third embodiment, the down-link channel of fast transmission speed is used in the first data transmission, and the down-link channel of slow transmission speed is used in re-send, and moreover since the communication range is different between the first data transmission and later re-send data transmission, the re-send data can be received if the terminal is moved.

Further, since the down-link channel of fast transmission speed is used in the first data transmission and the down-link channel of slow transmission speed is used in re-send, the re-send data can be transmitted in a wider range.

Further, since the down-link channel of fast transmission speed is used in the first data transmission and the down-link channel of slow transmission speed is used in re-send, the re-send data can be transmitted more easily because the terminal is very likely to have moved to a surrounding point from the place of the first data transmission.

(Fourth Embodiment)

FIG. 11 shows a constitution of a terminal apparatus in a fourth embodiment in which re-send request is made by the user's will. In FIG. 11, the description mainly relates to the mechanism of data re-send, and other functional parts are omitted, and only the re-send request by the user's will is explained.

In FIG. 11, supposing, for example, to transmit multiple still pictures to a mobile station 2a, a base station 1 transmits still picture data containing error detection code through a high speed down-link channel 3.

The mobile station 2a, receiving it, stores it once in the memory. Herein, it is possible that the stored data may contain errors. At this moment, the channel may be cut off, and later if the user wishes to see the still picture data, the data is decoded and (if necessary) shown in the display. If an error is detected in the decoding process, the user requests re-send manually.

In this embodiment, when an error is detected in decoding, the user can request re-send manually, and therefore it does not matter if error is contained in the data not necessary for the user (e.g. commercial message data), and re-send can be selectively requested only for necessary data, so that wasteful re-send requests can be suppressed.

In this way, power consumption in the mobile station 2a caused by unnecessary re-send control and wasteful spending of radio resources can be eliminated. Moreover, when the user can request re-send, the user can control to prevent consumption of battery, if the battery of the mobile station 2a is nearly exhausted, due to automatic re-send request, and the user can check whether re-send request is given priority or not and operate accordingly. Or, by detecting the degree of consumption of the battery of the mobile station 2a, re-send may be requested automatically while the battery is not exhausted, and when the battery is exhausted, the user can decide whether or not to request re-send automatically, so that unnecessary spending of battery is suppressed.

For example, as shown in FIG. 12, when transmitting map data, to go from point "A" to point "B", it does not matter if data in region 2b containing point "C" is wrong, and re-send is not requested automatically, so that the same effects as mentioned above may be expected.

Moreover, since re-send may be requested later, if the data around point "C" which is not necessary initially has become necessary, re-send may be requested later, and the data around point "C" may be obtained. The packet may be designed to be capable of decoding error correction. Thus, the number of times of re-send can be curtailed.

As described herein, according to the fourth embodiment, by requesting re-send by an action of the user, it is possible to prevent consumption of the battery due to automatic error checking or re-send control, for example, when the power is insufficient.

(Fifth Embodiment)

A fifth embodiment is also same in constitution as the first embodiment shown in FIG. 7. In FIG. 7, a high speed down-link channels 3 is disposed in a spot, and a low speed down-link channel 4 and a low speed up-link channel 5 are covered in a wide area. When the radio communication system in such constitution is built up, the up-link channel is the low speed channel 5 only. When a mobile station 2 which is a mobile portable terminal gets into the spot area (narrow service area 6) as shown in FIG. 7, the following problem occurs.

Since the mobile station 2 is a portable terminal that can be moved, when getting into the spot area 6, the mobile station 2 wants to acquire large capacity data using high speed channel (high speed down-link channel 3). In the multimedia communication environments handling data of various media, the terminal, the mobile station 2 can transmit request of difference data in batch to the base station 1. In this case, in the base station 1, a logical channel is formed with the terminal (mobile station 2) for each type of media, and protocol processing such as data request confirmation is done on each type of media. Moreover, as error control, ARQ processing is done on each type of media.

Herein, supposing the high speed down-link channel 3 is faster than the low speed up-link channel 5 by two digits or more, data transmission in the high speed channel 3 is stopped while these protocol processes are being transmitted by the low speed up-link channel 5, and the merit of high speed of the down-link channel 3 cannot be utilized.

Supposing the transmission speed of the low speed channels 4, 5 to be 32 Kbps and the transmission speed of the high speed down-link channel 3 to be 155 Mbps, if transmission for 600 bits is performed for protocol processing by using the low speed channel 5 after getting into the spot area (service area 6), in this period, the high speed down-link channel 3, capable of transmitting data of about 3M bits, must wait, and the high speed channel 5 cannot be utilized effectively.

In this embodiment, therefore, the terminal (mobile station 2), when wishing to acquire data in the spot area (service area 6), reserves a desired data acquisition request by using the low speed channels 4, 5 before getting into this spot area. In the case of reservation, all other protocol processes than the protocol for radio communication such as validation and request confirmation in the media are transmitted by using the low speed channel 4, 5. At the base station 1 and network side, the data of demanded media are multiplexed preliminary.

When the terminal (mobile station 2) gets into the spot area (service area 6), in the transmission by the up-link channel 5 from the terminal (mobile station 2) to the control station (base station 1), data transmission is limited only to those necessary for establishing radio communication of the control station with the terminal such as ID (identification code) of the terminal (mobile station 2). of course, ARQ processing is not done.

When the signal series of the media multiplexed preliminary is transmitted to the terminal, this down-link data (transmission data from the base station 1) does not depend on the up-link data (data from the mobile station 2), and only reserved data is transmitted. After completion of transmission of all reserved data, mutual data exchange is done, such as ARQ processing and transmission of control data, by using the up-link channel 5. If, however, the terminal (mobile station 2) moves out of the spot area before error control by ARQ is over, ARQ processing is done by using the low speed channel same as in the first embodiment.

In this embodiment, in this way, the request of data desired by the terminal is first reserved outside the spot area by using the low speed channel. At the network side, the demanded data is multiplexed preliminary, and prepared as one set of data. When the terminal gets into the spot area, after connecting the radio channel, the high speed down-link channel transmits the reserved set of data. ARQ processing and others are done after sending all reserved data.

In the spot area, the transmission speeds of the up- and down-link channels are extremely asymmetrical, and the low speed up-link channel is a bottle neck, and the high speed down-link channel 3 does not function efficiently. However, according to the present embodiment, using the high speed down-link channel within the spot area, the reserved data is transmitted without executing error control by ARQ processing, so that the transmission capacity of the high speed down-link channel can be utilized to the maximum extent.

In the foregoing embodiments, data re-send is done later, and use of radio resources not necessary for applications not requiring real time service or unnecessary power consumption can be avoided, so that it is possible to present the re-send control method suited to personal communication demanding mobility and portability. Thus, by rational re-send control in the event of occurrence of transmission error, the present invention is devised from the viewpoint of elimination of wasteful use of radio resources and effective utilization in the above embodiments.

To eliminate wasteful use of radio resources and utilize effectively, it is also important to transmit rationally by understanding the nature of the data to be transmitted. Considering the present invention from this point of view, embodiments for improvement are described below. Herein, in the radio communication system disposing the high speed down-channel in a spot and the low speed channels in a wide range, a system of providing applications that cannot be served unless the high speed transmission path is kept, in principle, such as moving picture communication, in a wide range is described.

In principle, the data to be transmitted is coded by dividing into primary data and secondary data, and the primary data is transmitted through the high speed down-link channel, and secondary data is transmitted through the low speed channel.

In the method of coding into primary data and secondary data by data source coding, generally, the quantity of data transmitted per unit time (data density) is lager in the primary data than in the secondary data. In such coding, with the primary data alone, there is no meaning as data, and the secondary data is more responsible from the viewpoint of data transmission. The primary data is the data shared between the terminal and the data transmission source, and the secondary data is the data to be transmitted on every opportunity. Therefore, the primary data must be shared already between the terminal and base station at points where transmitting data occurs occasionally, and hence transmission by high speed channel is desired.

To realize high speed radio channel, generally, a high frequency band must be used. Supposing the high speed down-link channel to be a channel of 155 Mbps, it is difficult to realize it by a frequency band of about 800 MHz to 2 GHz presently used in portable telephone and others. If one user occupies a band of 155 MHz in an 800 MHz band, other services cannot be offered at all and it is impossible. Such high speed radio channel may be provided over the millimeter wave band (60 GHz band) which is not used at the present. In radio transmission in millimeter wave band, the service area covered by one base station is about several meters to several tens of meters due to the wave propagation characteristics. With such high speed down-link channel, it is difficult to cover the entire region of the present portable telephone, and only a spot service limited to a particular region can be presented.

On the other hand, the low speed channel can sufficiently transmit in this band of 800 MHz to 2 GHz. Supposing the transmission speed of the low speed down-link channel to be about 32 Kbps, it is possible to realize by using the existing channel of portable telephone. In this case, the service area covered by one base station is about hundreds of meters to several kilometers, and it is possible to transmit by covering the entire area of wide service range by using the existing infrastructure.

By transmitting such data hierarchically and classified into primary data and secondary data through the high speed channel covering a spot area and the low speed channel covering a wide area, data providing service of wide area and high quality can be realized, and if high speed down-link channel and low speed channel coexist in the same area, and the data is classified into primary data and secondary data, by using the high speed down-link channel only when transmitting the primary data and using the low speed down-link channel when transmitting the secondary data, the frequency utilization efficiency is enhanced, and high functional service can be offered in a wide range.

(Sixth Embodiment)

Figure 13:
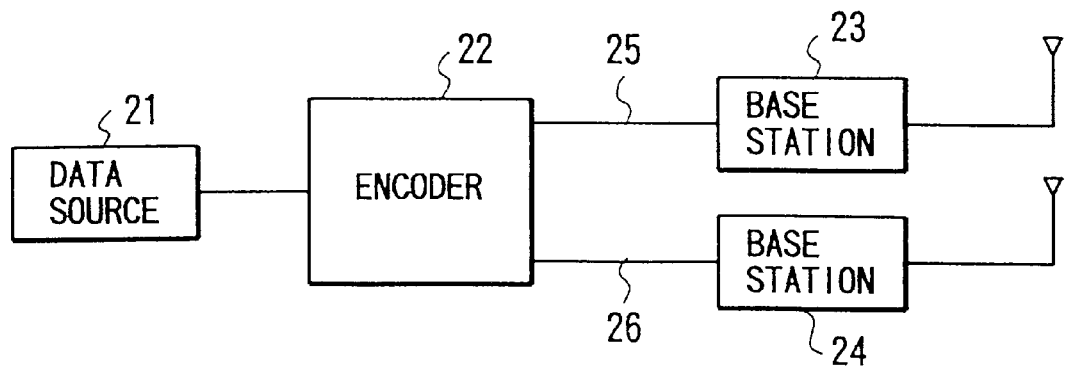
FIG. 13 is a block diagram showing a constitution of a transmitter at data provider side in a sixth embodiment of the present invention.

FIG. 13 is a block diagram showing the transmitter of the service provider side in a sixth embodiment. A data source 21 which generates data is connected to an encoder 22, and the data generated from the data source 21 is dividedly coded into primary data 25 and secondary data 26. The primary data 25 is transmitted from a base station 23 for the purpose of high speed radio transmission, and the secondary data 26 is transmitted from a base station 24 for the purpose of low speed radio transmission.

Figure 14:
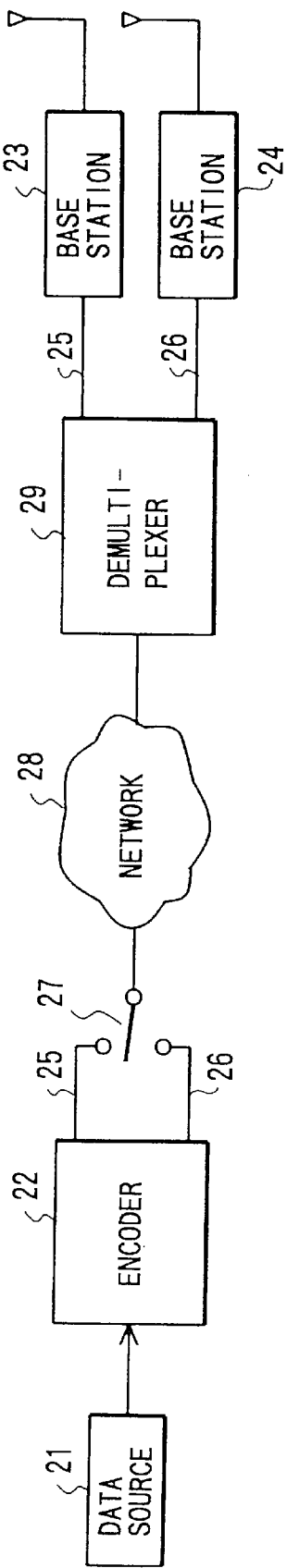
FIG. 14 is a block diagram showing another constitution of a transmitter at data provider side in the sixth embodiment.

Instead of this constitution, as shown in FIG. 14, the service provider side and the transmitter may be separated through a network 28. The data generated from the data source 21 is divided into primary data 25 and secondary data 26 and coded by the encoder 22, and the coded primary data 25 and secondary data 26 are multiplexed in terms of time by a predetermined rule in a multiplexer 27. At this time, whether the transmitted signal is primary data 25 or secondary data 26 is indicated by the data bit added thereto.

The multiplexed signal is transmitted through the network 28 and is put into a demultiplexer 29. In the demultiplexer 29, detecting whether primary data or secondary data based on the added data bit, the primary data 25 is transmitted through the base station 23 for high speed radio transmission. The secondary data 26 is transmitted through the base station 24 for low speed radio transmission.

Figure 15:
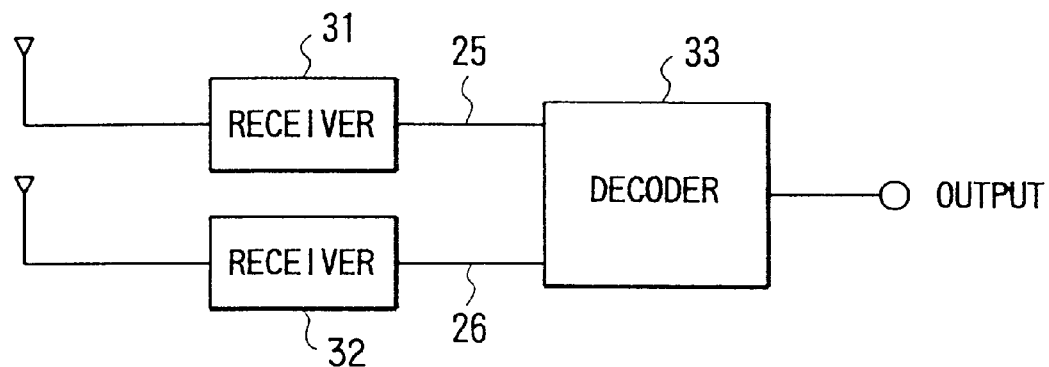
FIG. 15 is a block diagram showing a receiver at terminal side in the sixth embodiment.

FIG. 15 is a block diagram showing a constitution of a receiver at terminal side. The receiver comprises a high speed receiver 31, a low speed receiver 32, and a decoder 33 for decoding the signals received in these receivers 31, 32.

At the terminal of such constitution, first the primary data 25 is received in the high speed receiver 31, and is accumulated in the decoder 33. The receiver 32 is a low speed receiver, which receives the secondary data 26. In the decoder 33, the received primary data 25 and secondary data 26 are decoded, and data are picked up.

In the constitutions shown in FIG. 13 to FIG. 15, meanwhile, transmitter and receiver for the up-link channel from the terminal to the service provider side (base station side) are not shown, but, of course, the terminal has the transmitter for low speed up-link channel and the base station has the receiver.

FIG. 16 and FIG. 17 are explanatory diagrams showing examples of data acquisition in this embodiment.

Suppose that the service provider provides data to the terminal. This is an example of providing shopping data by radio.

A base station 41 is a base station having a high speed down-link channel 46, and its service area 43 is present in a spot. A base station 42 is a base station having a low speed down-link channel 47 and a low speed up-link channel 45, and its service area 44 is wide. The high speed down-link channel 46 served by the base station 41 is transmitted by millimeter wave band, and the low speed up-link channel 45 and low speed down-link channel 47 served by the base station 42 are transmitted by microwaves.

A terminal 48 reports the request of acquisition of shopping data to the network NW by using the low speed up-link channel 45. In the network NW, the data from the service provider 40 for providing shopping data service is transmitted to the terminal 48. The data from the service provider 40 is divided into primary data such as merchandise catalog, price, general term of delivery and others, and secondary data such as discount price, delivery term for individual customers and others.

In the initial data such as catalog data, moving pictures are used in order to show the detail of the merchandise, and a large capacity of data must be transmitted in batch to deal with a great number of articles of merchandise.

By contrast, the secondary data such as discount price and term of delivery is determined by negotiation with each customer possessing the terminal, and only the data of the merchandise specified by the customer is presented, and hence the quantity of data is very small. Incidentally, the primary data is one-way notice data not depending on the data transmitted from the customer to the service provider by using the up-link channel from the terminal to the base station, while there secondary data is the data depending on the up-link data.

Accordingly, when the network NW detects that the terminal 48 has entered the spot area 43 capable of communicating with the base station 41, the primary data is transmitted to the terminal 48 from the base station 41 (FIG. 16). In the diagram, the thickness of the arrows 45, 46, 47 represents the transmission speed. The primary data is transmitted by using the high speed down-link channel 45 of 155 Mbps. At the terminal 48, the primary data transmitted from the base station 41 is accumulated in the memory. At the terminal end, the customer searches desired merchandise from the obtained primary data and selects the desired merchandise.

The terminal 48 is a mobile portable terminal, which may be moved out of the spot area 43 depending on the circumstance. Herein, suppose it is moved outside of the spot area 3 while selecting the merchandise (FIG. 17). The terminal 48 is outside the spot area 43, but remains inside of the wide area 44 communicative with the base station 42 through the low speed down-link channel 47. The customer, when deciding the desired merchandise, selects the merchandise, and the terminal 48 sends the selected merchandise number and other data to the service provider 50 through the up-link channel 45. At this time, the customer negotiates with the service provider 40 about the price and delivery time by using the low speed up- and down-link channels 45, 47. Thus, even if going out of the spot area 43, the data transmission continues.

As described above, according to the present embodiment, of the data hierarchically and classified into primary data and secondary data, by transmitting the primary data by the high speed channel in the spot area 43 and transmitting the secondary data by the low speed channel in the wide area 44, data providing service of high quality may be realized in a wide area.

This embodiment related to an example of shopping data service, and examples of applications in this form are listed below.

First is distribution of fighting game software.

In a fighting game, the game program is predetermined. The game is made up by the input of operations by the players. Supposing a shooting game, for example, the background, appearance of characters, action of characters when a command is given, and other data and program are fixed, and each player gives the moving direction of characters, use of weapons and others as the commands.

The fixed data, preset data, and program are transmitted as primary data by the high speed down-link channel, and the commands varying depending on the reaction of the competitor are transmitted as secondary data by the low speed channel.

In the conventional game software, programs and other fixed data are preliminary distributed by package media such as CD and ROM cassette, and the commands are exchanged by communication media. In this embodiment, all can be realized by the communication method.

Second, the present embodiment is also effective in the case of using the own database existing on the network by the portable terminal. When using the own database (for example, the own telephone book) on the network, first of all, all entries in the database are necessary, and the high speed down-link channel is used for the first database access, so that the transmission of database is completed in a short time. When the content of the database is left over at the terminal, if the content of the database is changed (for example, the telephone number is changed) at the time of second or subsequent access, only the changed portion should be transmitted in the low speed down-link channel.

In this embodiment, transmission in the spot area is necessary only in the first place and when transmitting all data of the database for data verification or the like, and the database not changed very frequently can be usually served in the wide range.

Third is known map data service or navigation system.

In the map data service or navigation service, the map data itself is nearly fixed data, and is transmitted by the high speed channel as primary data. It is also provided by package media such as CD same as in the example above, but it is to be updated from time to time in a relatively long time, and it must be purchased again on each occasion. By data transfer using the communication media through high speed channel, latest data is always supplied.

In these services, additional data are effective in many cases. For example, road traffic data is known, and it is important to know in real time how the road is crowded or how long it takes to reach the destination. Or in other possible application, when the building of a certain company on the map is specified, the organization members and other data of the company are shown, and the present location of a specific person is shown (whether going out, staying in the company, or having already left), or the specific person may be automatically called by telephone when designated. To realize such additional service, transmission of latest data changing moment by moment or real-time data is indispensable.

In this way, semi-fixed data such as map and location data is transmitted as primary data by the high speed channel, while the data possibly changing moment by moment is transmitted as secondary data by the low speed channel.

Fourth is a telephone service in the case of voice coding by using code book. In the automobile telephone or portable telephone, in order to curtail the quantity of data to be transmitted, the code book is used at both transmitter side and receiver side, and at the transmitter side, by spectral analysis of the voice to be transmitted, the signal to be transmitted is generated by referring to the code book depending on the result of analysis. At the receiver side, the received signal is regenerated into voice signal by referring to the code book. It is known that optimum code book parameters differs depending on the sex, male or female, the language, English, Japanese, etc., but in the existing automobile telephone and portable telephone, a common code book is used regardless of the user of communication, and it is hard to reproduce the voice correctly, and the data to be transmitted is redundant. To solve these problems, it is proposed to prepare a code book for each user of communication, store it in the memory, and use by changing over on every occasion of communication (Japanese Patent Disclosure No. 5-181499). In this proposal, a memory of large capacity is provided on both sides, and plural code books are stored, and are changed over and used depending on the ID of the communication partner. However, if the communication partners are an unspecified majority people, or when the terminal is used by plural users, code books are many, and the memory is occupied more than necessary. Accordingly, the code book data is transmitted by the high speed down-link channel, and only coded data is transmitted by the low speed down-link channel. In this manner, the quantity of data to be sent out to the transmission path can be curtailed same as in the situation of having plural code books by one terminal, and it is not necessary to have always an excessive memory. Moreover, by optimizing the parameters of code book, voice can be reproduced as closely to the original voice as possible.

Not limited to the voice coding case, by using a common dictionary (code book) at the transmitter side and receiver side, and referring to the dictionary, when transmitting data, the dictionary data is transmitted by the high speed down-link channel, and only the coded data is transmitted by the low speed down-link channel, so that data transmission of high quality may be realized in a wide area.

Fifth is moving picture transmission. In moving picture transmission, as mentioned above, the data is divided into primary data and secondary data, such as initial frame and differential data, and object and its motion. The primary data is transmitted by high speed channel, and secondary data by low speed channel.

Sixth is image transmission by intellectual coding. In transmission of image data and others, in the method of coding the image itself and transmitting, data compression is limited. Instead, it is attempted to transmit the event performed by the object in the image. Such attempts are called transmission by intellectual coding.

For example, the human face is modeled by combination of several lines (wire frame model), and events of the face such as laughing, getting angry and crying are expressed by the data of move of the wires and junctions, and only the events of the data (laughing, getting angry, crying, etc.) are transmitted.

Alternatively, as for an object in an image, data such as its shape, color and structure, and motion corresponding to various operations are shared on both sides, and only the motion and moving direction are transmitted.

For instance, supposing to transmit an image of a flying airplane, the structure, color, shape and flight style of the airplane, and the background, airport structure, geography and others are shared on both sides, and the transmitter side transmits events such as flying, going up, going down, turning right, and turning left, and the receiver side receives the events and displays as an image.

In such mode of communication, face model, object data, operation program, and other non-changing data are transmitted as primary data by the high speed channel, while object motion events and other changing data are transmitted in a wide area by using the low speed channel.

In this way, the maximum effects of the present embodiment are brought about when the data source is hierarchically coded, being classified into primary data not depending on the data of the up-link channel, and secondary data of real time property changing moment by moment by the data of the up-link channel, and moreover the primary data is large in capacity and the secondary data is small in data quantity occurring in unit time.

On the other hands, in the CSCW (computer supported cooperative work), original data of files of documents and images used in editing work jointly by plural members are saved in the computer called file server. When editing the file, the original data accumulated in the file server is down-loaded to the terminal, and when the document or image is added or deleted, the data is fed back to the original data in the file server.

FIG. 18 shows an example of editing a file 52 of document or image stored in a place remote from a portable terminal 48 through the network. A base station 41 is a base station having a high speed down-link channel 46. A base station 42 is a base station having a low speed down-link channel 47 and a low speed up-link channel 45. The thickness of arrows 45, 46, 47 in the diagram represents the radio transmission speed.

When editing the file 52 at the portable terminal 48, the portable terminal 48, wishing to obtain the original data of the file 52, reports to the file server 51 through the network NW by using the low speed up-link channel 45. The file server 51 transmits the original data of the file 52 to the terminal 48 as primary data by using the high speed down-link channel 46. The original data of the file 52 is the file of document of image already created, and the quantity of data is large.

By transmitting this original data by the high speed down-link channel 46 through the base station 41, it can be down-loaded in a short time. Once down-loaded, the original data is accumulated in the memory of the portable terminal, and thereafter it is not necessary to continue connection of the high speed down-link channel 46. In this original data, when the document or image is added or deleted at the portable terminal 48, this editing history is sequentially transmitted to the file server 51 through the low speed up-link channel 45. In the file server 51, this editing history is fed back to the original data.

On the other hand, when the same file as the file 52 edited at the portable terminal 48 is simultaneously edited at other terminal, it is necessary to keep uniformity between the original data and the data available at the portable terminals. In the system shown in FIG. 18, if the original data in the file server 51 is altered by the editing work at other terminal, the differential data is transmitted to the portable terminal 48 as secondary data through the low speed down-link channel 47 from the base station 42.

The above data of editing history or differential data of file is small in data quantity as compared with the original data, delay will not be increased if transmitted by using the low speed channel 47. As the method of use of low speed channel, there is a method of holding the radio communication channel while the file editing work is continued, and in this method when the channel is set in the first plate, it is not thereafter required to repeat the channel setting every time data occurs.

Or in a method of establishing the radio communication channel when editing history data or file differential data occurs, the channel is not occupied wastefully while there is no data to be transmitted, and hence the radio resources can be utilized effectively.

As described herein, according to the sixth embodiment, in the radio communication system having high speed down-link channel, low speed down-link channel, and up-link channel of which transmission speed is same as that of low speed down-link channel, when the data to be transmitted is divided into primary data and secondary data, the primary data is not affected by the up-link data transmitted through the up-link channel, and is fixed data without change such as dictionary, whereas the secondary data is the value changed by the up-link data transmitted from the terminal to the base station, and by processing the primary data by the secondary data, the data desired by the use is coded in an available form. Therefore, when the terminal gets into the service area of high speed down-link channel, the primary data is loaded to the terminal side by using the high speed down-link channel. At the terminal side, the primary data is stored in the memory. Afterwards, at the terminal, the data is restored by using the secondary data transmitted through the low speed down-link channel and the primary data stored in the memory.

When transmitting data in such system configuration, hitherto, the high speed channel offered services requiring high speed channel such as moving picture data, and the low speed channel presented low speed data such as voice, and therefore in the service requiring high speed channel, the service area is extremely limited. In the present invention, by transmitting the primary data delivered by hierarchically data source coding by the high speed channel and the secondary data by the low speed channel, the service requiring high speed transmission can be presented in a wide range, and hence rational transmission is done and the channel can be utilized effectively.

(Seventh Embodiment)

Figure 20:
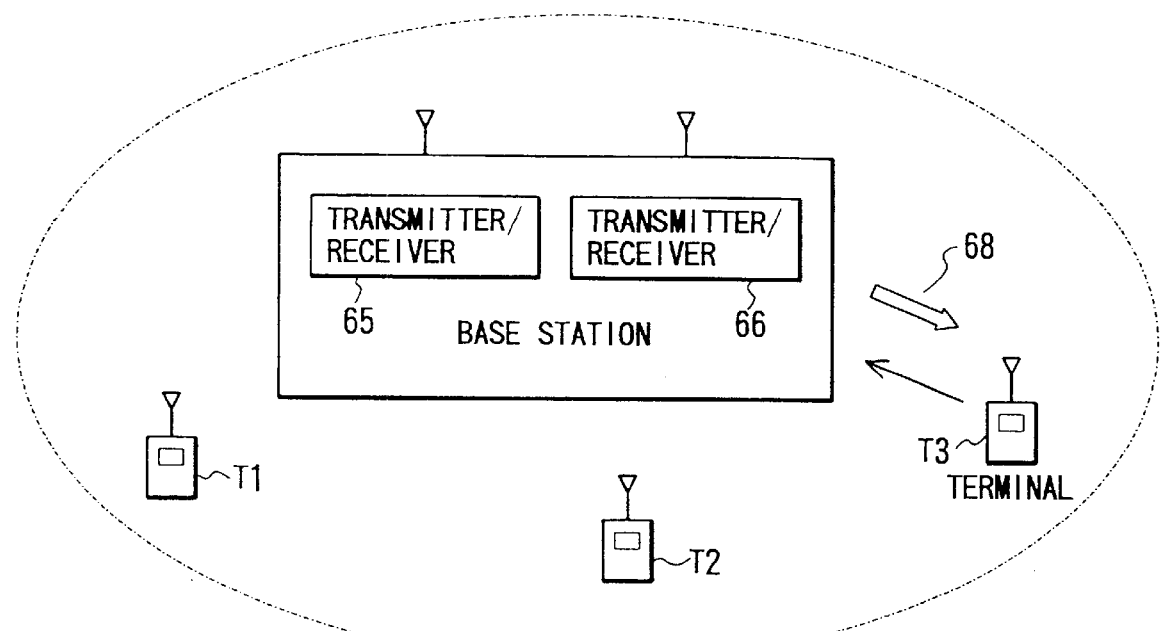
FIG. 20 is a conceptual diagram showing an example of operation in the seventh embodiment.
Figure 21:
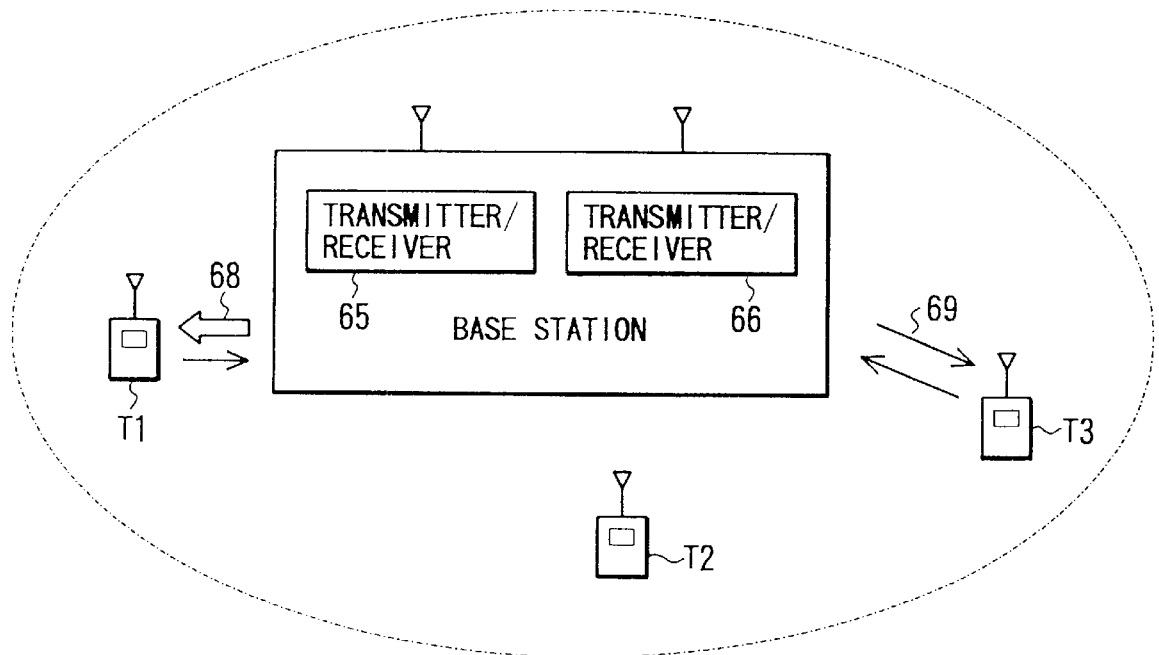
FIG. 21 is a conceptual diagram showing an example of operation in the seventh embodiment together with FIG. 20.

A seventh embodiment is shown in FIGS. 19, 20, and 21.

In the sixth embodiment, the coverage area of the base station having high speed down-link channel is a spot, and the coverage area of the base station having low speed down-link channel is a wide range, and two areas are disposed hierarchically. In the present embodiment, channels of high speed and low speed have a same coverage area.

In FIG. 19, data delivered from a data source 61 is divided and coded into primary data 63 and secondary data 64 in an encoder 62. The primary data 63 is transmitted by a transmitter 65 for transmitting by a high speed down-link channel, and the secondary data 64, by a transmitter 66 for transmitting by a low speed down-link channel. Generally, the primary data is transmitted in the initial phase of the time zone for transmitting.

FIG. 20 shows a state in which a terminal T3 starts communication. Terminals T1 and T2 are not making communications. Strictly speaking, control data and the like are exchanged, but they are not making communications about data acquisition from the service provider and the like. The terminal T3, when starting communication, loads the primary data by using a high speed down-link channel 68 delivered from a transmitter/receiver 65. Using the high speed down-link channel 68, transmission of primary data is finished in a short time.

FIG. 21 shows a later state in which the terminal T1 is about to start communication. At this moment, the terminal T3 has already finished transmission of primary data, and the terminal T1 is now ready to transmit the primary data. If the transmission of primary data of the terminal T3 is not finished, because the transmission is done through the high speed down-link channel 68, the terminal can establish the channel by a short waiting time. While the terminal T1 is acquiring data by using high speed channel 68, the terminal T3 is acquiring the secondary data by using the low speed channel 69.

Generally, a high speed channel occupies a wide frequency band. When plural users communicate, it is difficult to assign one frequency channel of high speed channel for each because a very wide frequency band is needed. For example, supposing 100 users are staying in this area, if one user occupies a band of 155 MHz, a band of over 15 GHz is needed. In the case of low speed channel, if assigned to plural users, the frequency band per user is narrow, and hence there is no problem. If 50 kHz is assigned to each one of 100 users, for example, the total is 5 MHz at most. It is thus not preferable for efficient use of frequency to use plural high speed channels and assign one to each user.

However, when the data is divided into primary data and secondary data, the high speed down-link channel is used only when transmitting the primary data, and the low speed down-link channel is used when transmitting secondary data, the frequency utilization efficiency is enhanced, and high functional service can be presented in a wide range by employing the arrangement shown in FIGS. 19, 20, and 21.

The above moving picture transmission is applied in this embodiment. In moving picture transmission, when transmitting from a prepared data source to the terminal, the frame at the screen changing point is transmitted as the primary frames in batch as primary data, and the remaining differential data only is transmitted as secondary data, so that it is possible to transmit in a hierarchically area configuration consisting of spot area and wide area.

When attempted to transmit in real time, however the problem is that it took a very long time to transmit by the low speed channel when the terminal is located in a wide area because the primary frame appeared upon change of screen regardless of the area in which the terminal is located. In the present embodiment, the service area is identical between the high speed channel and low speed channel, and the primary data can be transmitted by the high speed channel every time the primary frame appears, so that real-time transmission of moving picture may be realized.

A system configuration example of applying this embodiment in display of portable data terminal is shown in FIG. 22. This data terminal has a display function aside from a receiver 71 for radio communication, and displays in a display unit 73 by a display controller 72 on the basis of the display data transmitted from the network and base station. The display data transmitted from the base station is classified into the screen data for displaying, and commands for operating such as scroll-up and scroll-down of screen, and page jump. The image data is the data transferred at high speed to memories 74a to 74c, and the commands are small in data quantity as compared with data, being data that must be transmitted at low speed and in real time. By transferring the data by high speed down-link channel and transmitting the command by low speed channel, more efficient service of higher quality can be presented.

Other method of covering the same zone by the high speed down-link channel and low speed channel is shown in FIG. 23. The high speed channel comprises millimeter waves, and the zone is narrow because of the radio propagation characteristic. Hence, the same zone as the zone of low speed channel is covered by plural base stations.

In FIG. 23, base station "A" is a base station for communicating by low speed channel, which covers a large zone Z5. Base stations "B1" to "B4" are base stations having high speed down-link channels, covering small zones "Z1" to "Z4", respectively. In such zone configuration, the high speed down-link channel and low speed channel can be used in the same zone, and by transmitting the primary data and secondary data by high speed channel and low speed channel respectively, high quality services of excellent frequency utilization efficiency can be presented in a wide range.

As described above, in the conventional re-send control method in the event of error, data re-send is requested on the spot, and data is re-sent immediately even in the application not requiring real time service, and therefore unnecessary radio resources are used or unnecessary power consumption accompanied, but according to the present invention, by re-sending data later, unnecessary use of radio resources and unnecessary power consumption can be avoided in the application not requiring real time service, so that the radio communication system suited to the personal communication requiring mobility and portability can be presented.

Also according to the present invention, the data to be transmitted is classified into primary data and secondary data, and each data is transmitted by selectively using the high speed channel covering a spot area and the low speed channel covering a wide area, the radio communication system capable of realizing data presentation service of wide area and high quality can be presented. Moreover, if high speed down-link channel and low speed channel coexist in the same area, and the data is divided into primary data and secondary data, by using the high speed down-link channel only when transmitting the primary data and using the low speed down-link channel when transmitting secondary data, the frequency utilization efficiency is enhanced, and high functional services can be offered in a wide range.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents. For example, each embodiment is explained alone, but plural embodiments may be also appropriately combined.

What is claimed is:

1. A radio communication system comprising:
   at least one transmitting station configured to transmit data comprising plural data packets to at least one receiving station configured to receive data;
   a sending device configured to send response signals from said at least one receiving station to said at least one transmitting station, each of said response signals showing presence or absence of transmission error in said plural data packets; and
   a re-sending device configured to re-send data packets, in which presence of the transmission error is indicated by said response signals, from said at least one transmitting station to said at least one receiving station,
   wherein said at least one transmitting station includes,
   a down-link channel from said at least one transmitting station to said at least one receiving station that comprises,
      a high speed transmission down-link channel, and
      a low speed transmission down-link channel, and
      an up-link channel from said at least one receiving station to said at least one transmitting station, said up-link channel being equal in transmission speed to said low speed transmission down-link channel, and
   wherein a communication range of said high speed transmission down-link channel is different from a communication range of said low speed transmission down-link channel.

2. A radio communication system comprising:
   at least one transmitting station configured to transmit data comprising plural data packets to at least one receiving station configured to receive data;
   a sending device configured to send response signals from said at least one receiving station to said at least one transmitting station, each of said response signals showing presence or absence of transmission error in said plural data packets; and
   a re-sending device configured to re-send data packets, in which presence of the transmission error is indicated by said response signals, from said at least one transmitting station to said at least one receiving station,
   wherein said at least one transmitting station includes,
   a down-link channel from said at least one transmitting station to said at least one receiving station that comprises,
      a high speed transmission down-link channel, and
      a low speed transmission down-link channel, and
      an up-link channel from said at least one receiving station to said at least one transmitting station, said up-link channel being equal in transmission speed to said low speed transmission down-link channel, and wherein said re-sending device re-sends data by said high speed transmission down-link channel only when a data quantity to be re-sent is more than a specified quantity, and re-sends data by said low speed transmission down-link channel when the data quantity to be re-sent is equal to or less than the specified quantity.

* * * * *